US012697281B2

(12) United States Patent
Sakane

(10) Patent No.: US 12,697,281 B2
(45) **Date of Patent: *Aug. 4, 2026**

(54) PUNCTURE PORT, LIQUID STORAGE CONTAINER, PRODUCTION METHOD FOR SAID PUNCTURE PORT, AND PRODUCTION METHOD FOR SAID LIQUID STORAGE CONTAINER

(71) Applicant: JMS CO., LTD., Hiroshima (JP)

(72) Inventor: Hiroto Sakane, Hiroshima (JP)

(73) Assignee: JMS CO., LTD., Hiroshima (JP)

( * ) Notice: Subject to any disclaimer, the term of this patent is extended or adjusted under 35 U.S.C. 154(b) by 317 days.

This patent is subject to a terminal disclaimer.

(21) Appl. No.: 18/286,519

(22) PCT Filed: Mar. 31, 2022

(86) PCT No.: PCT/JP2022/016793

§ 371 (c)(1),
(2) Date: Oct. 11, 2023

(87) PCT Pub. No.: WO2022/220162

PCT Pub. Date: Oct. 20, 2022

(65) Prior Publication Data

US 2024/0197567 A1 Jun. 20, 2024

(30) Foreign Application Priority Data

Apr. 12, 2021 (JP) ................................ 2021-067308

(51) Int. Cl.
*A61J 1/14* (2023.01)
*B65D 43/02* (2006.01)
*A61J 1/10* (2006.01)

(52) U.S. Cl.
CPC ........... *A61J 1/1475* (2013.01); *A61J 1/1406* (2013.01); *A61J 1/1412* (2013.01);
(Continued)

(58) Field of Classification Search
CPC ...... A61J 1/1475; A61J 1/1406; A61J 1/1412; A61J 1/10; A61J 3/00
See application file for complete search history.

(56) References Cited

U.S. PATENT DOCUMENTS 7,780,644 B2 * 8/2010 Miyajima ............ A61J 1/1475
604/416
2005/0059951 A1 * 3/2005 Young ...................... A61J 1/10
604/403

(Continued)

FOREIGN PATENT DOCUMENTS

JP 2004-129867 A 4/2004
JP 2004248892 A 9/2004

(Continued)

OTHER PUBLICATIONS

An Office Action in corresponding U.S. Appl. No. 18/579,237 dated Mar. 10, 2026 is attached, 16 pages.

*Primary Examiner* — Susan S Su
(74) *Attorney, Agent, or Firm* — MUNCY, GEISSLER, OLDS & LOWE, P.C.

(57) ABSTRACT

The present invention provides: a puncture port which is capable of ensuring sealability when a puncture is formed, regardless of the size of an insertion part of a puncture instrument; and a liquid storage container equipped with such a puncture port. A puncture port 40 is provided to a liquid storage container for storing a liquid, is to be punctured by a puncture instrument 200 equipped with a needle tube part 210 having a through-hole 215 formed therein, and comprises: a cylindrical port body 43; and a first partition wall 411 and a second partition wall 421 that are provided to the port body 43. In the puncturing direction, the distance D between the first partition wall 411 and the second partition wall 421 is longer than the length HL in the puncturing direction of an opening portion 220 of the (Continued)

through-hole 215 at least at the leading end of the needle tube part 210.

5 Claims, 28 Drawing Sheets

(52) U.S. Cl.
CPC ............. *B65D 43/0202* (2013.01); *A61J 1/10* (2013.01); *B65D 2543/00842* (2013.01)

(56) References Cited

U.S. PATENT DOCUMENTS

| | | | | |
|---|---|---|---|---|
| 2006/0276769 | A1* | 12/2006 | Domkowski ......... | A61J 1/1475 604/408 |
| 2010/0179505 | A1* | 7/2010 | Muramatsu ........... | A61J 1/1475 156/290 |
| 2018/0050185 | A1 | 2/2018 | Kang | |

FOREIGN PATENT DOCUMENTS

| | | | | | |
|---|---|---|---|---|---|
| JP | 2007196048 | A | | 8/2007 | |
| JP | 2009285457 | A | * | 12/2009 | |
| JP | 2010088866 | A | | 4/2010 | |
| KR | 20090007179 | U | * | 7/2009 | ............ A61J 1/1475 |
| KR | 101168229 | B1 | * | 7/2012 | ............ A61J 1/1475 |
| KR | 200492817 | Y1 | * | 12/2020 | ............. B29C 45/00 |
| KR | 20220041398 | A | * | 4/2022 | ............ A61J 1/1406 |
| KR | 20230000257 | U | * | 2/2023 | ............ A61J 1/2006 |

* cited by examiner

PUNCTURE PORT, LIQUID STORAGE CONTAINER, PRODUCTION METHOD FOR SAID PUNCTURE PORT, AND PRODUCTION METHOD FOR SAID LIQUID STORAGE CONTAINER

TECHNICAL FIELD

The present invention relates to a puncture port and a liquid storage container including the puncture port.

BACKGROUND ART

Conventionally, liquid storage containers are used to store medical liquids such as blood and cells. Such a liquid storage container includes a puncture port into which a puncture instrument such as a bottle needle or a syringe for taking out contents or injecting a liquid such as saline is inserted. The puncture instrument includes a needle tube portion in which a through hole is provided. On the other hand, the puncture port has a cylindrical structure and includes a partition thereinside. When the liquid stored in the liquid storage container is taken out by the puncture instrument and the liquid is injected into the liquid storage container, the partition of the puncture port is punctured with the needle tube portion of the puncture instrument to penetrate the partition. Thus, the contents are taken out or injected through the needle tube portion.

Leakage of contents may occur when puncturing a puncture instrument into a puncture port. Specifically, when the length of the opening portion of the through hole in the tip portion of the needle tube portion of the puncture instrument is larger than the thickness of the partition, the inside and the outside of the puncture port communicate with each other in the middle of the penetration of the opening portion through the partition, resulting in leakage. Thus, leakage of the contents causes loss of the contents, and is not preferable from the viewpoint of maintaining sterility of the contents.

Therefore, a puncture instrument (medical plastic needle) capable of sealing a puncture port by fitting the puncture instrument and the puncture port before the tip of the puncture instrument penetrates the partition of the puncture port has been proposed (for example, see Patent Document 1).

CITATION LIST

Patent Document

Patent Document 1: Japanese Unexamined Patent Application, Publication No. 2007-196048

DISCLOSURE OF THE INVENTION

Problems to be Solved by the Invention

In the puncture instrument proposed in Patent Document 1, it is necessary to change the size of the outer diameter of the insertion portion (fitting portion) of the puncture instrument in accordance with the size of the inner diameter of the puncture port. Therefore, depending on the size of the puncture instrument, the sealing performance of the puncture port may not be maintained.

Accordingly, it is an object of the present invention to provide a puncture port capable of maintaining sealing performance when puncture is performed without being limited by the size of an insertion portion of a puncture instrument, and a liquid storage container including the puncture port.

Means for Solving the Problems

An embodiment of the present invention is directed to a puncture port that is provided in a liquid storage container for storing a liquid and is puncturable with a puncture instrument including a needle tube portion having a through hole provided therein, the puncture port including: a cylindrical port main body portion; and a first partition and a second partition provided in the cylindrical port main body portion, in which a distance between the first partition and the second partition in a puncture direction is longer than at least a length of an opening portion of the through hole at a tip portion of the needle tube portion in the puncture direction.

Further, an embodiment of the present invention is directed to a liquid storage container including: a liquid accommodation portion that accommodates a liquid; and the above-described puncture port having one end provided in an interior of the liquid accommodation portion.

Furthermore, it is preferable that the liquid accommodation portion is provided by welding peripheral edge portions of a set of sheet-shaped members provided in an opposite manner, the puncture port is welded to the set of sheet-shaped members, and the sheet-shaped members and the puncture port are made of a same material.

Further, an embodiment of the present invention is directed to a method of manufacturing a puncture port that is provided in a liquid storage container for storing a liquid and is puncturable with a puncture instrument including a needle tube portion having a through hole provided therein, the method including the steps of: preparing a cylindrical first port member including a first partition; preparing a cylindrical second port member including a second partition; inserting a portion or all of the second port member into the first port member so that the second partition is positioned inside the first port member; and welding an overlapping portion of the first port member and the second port member, after the inserting.

Further, an embodiment of the present invention is directed to a method of manufacturing a liquid storage container for storing a liquid, the liquid storage container including a puncture port that is puncturable with a puncture instrument including a needle tube portion having a through hole provided therein, and a liquid accommodation portion, the method including: preparing a set of sheet-shaped members; preparing a cylindrical first port member including a first partition; preparing a cylindrical second port member including a second partition; inserting a portion or all of the second port member into the first port member so that the second partition is positioned inside the first port member; providing the first port member and the second port member between the set of sheet-shaped members overlapped in an opposite manner, after the inserting; welding a portion where the first port member, the second port member, and the set of sheet-shaped members overlap, after the providing; and welding peripheral edge portions of the set of sheet-shaped members to form the liquid accommodation portion.

Further, it is preferable that the above-described puncture port further includes a cap portion including a lid portion, in which the cap portion is provided in the cylindrical port main body portion to cover the second partition, and during use, the lid portion is removable so that the second partition is exposed.

Further, it is preferable that the above-described puncture port further includes a gap for fluid to flow between the cylindrical port main body portion and the cap portion, and an open hole portion at a center portion of the second partition.

Effects of the Invention

According to an embodiment of the present invention, it is possible to provide a puncture port capable of maintaining sealing performance when puncture is performed without being limited by the size of the insertion portion of the puncture instrument, and a liquid storage container including the puncture port.

PREFERRED MODE FOR CARRYING OUT THE INVENTION

Preferred embodiments of a puncture port and a liquid storage container according to the present invention will now be described with reference to the drawings. The liquid storage container is mainly made of a sheet-shaped member made of a thermoplastic resin having flexibility, and is used for storing medical liquids of cells such as stem cells collected from a biological sample, cell preparations produced by culturing and processing these cells, blood, and blood preparations produced by processing blood. Further, the puncture port and the liquid storage container of the present invention are applicable to a case where a liquid requiring sterility is stored in addition to such a medical liquid.

Figure 1:
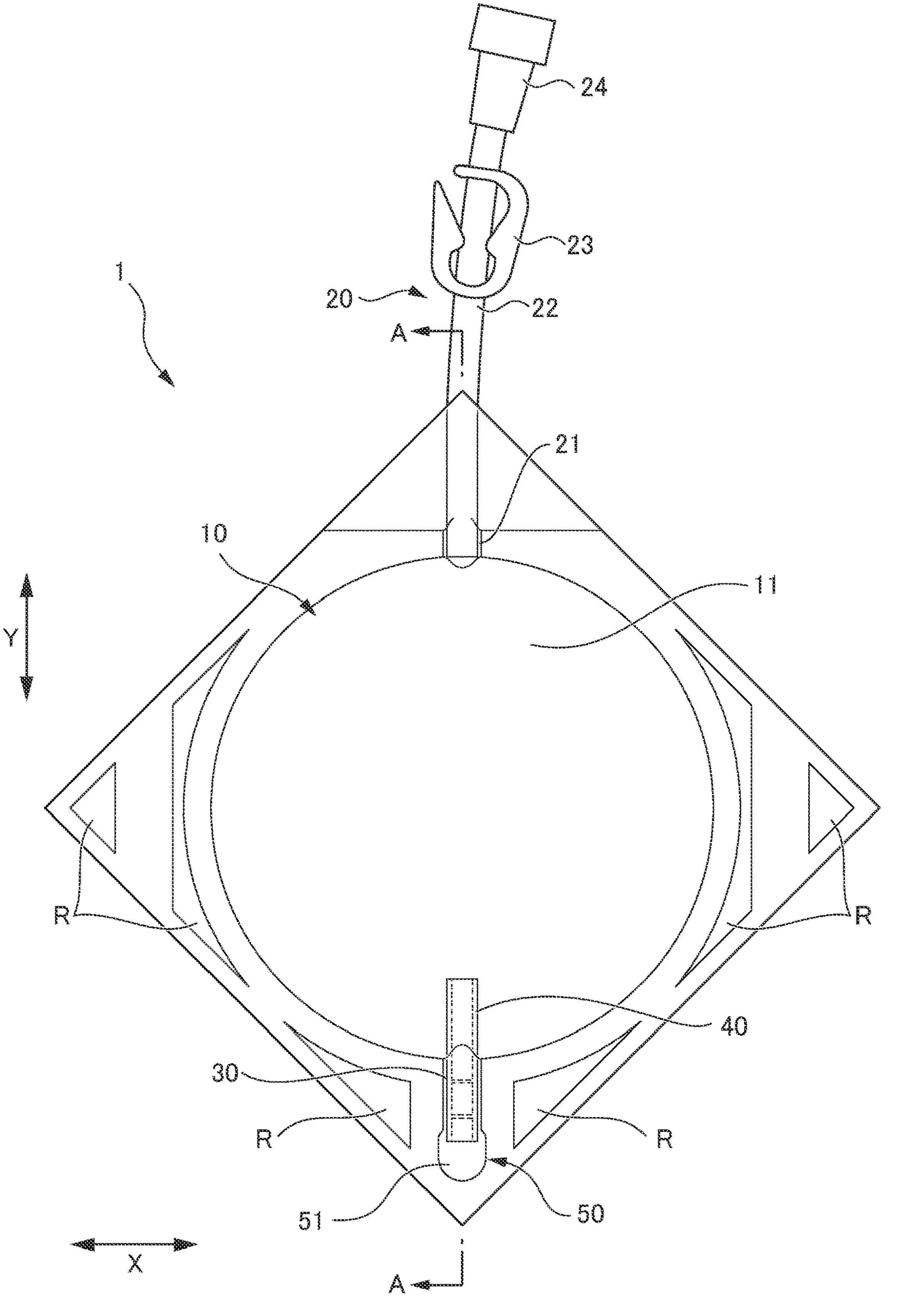
FIG. 1 is a plan view of a liquid storage container according to a first embodiment of the present invention.

First, a liquid storage container 1 according to a first embodiment will be described with reference to FIGS. 1 to 3. As shown in FIG. 1, the liquid storage container 1 of the first embodiment includes a liquid accommodation portion 10, a liquid introduction portion 20, a liquid discharge portion 30, a puncture port 40 provided in the liquid discharge portion 30, and a puncture port accommodation portion 50.

Figure 2:
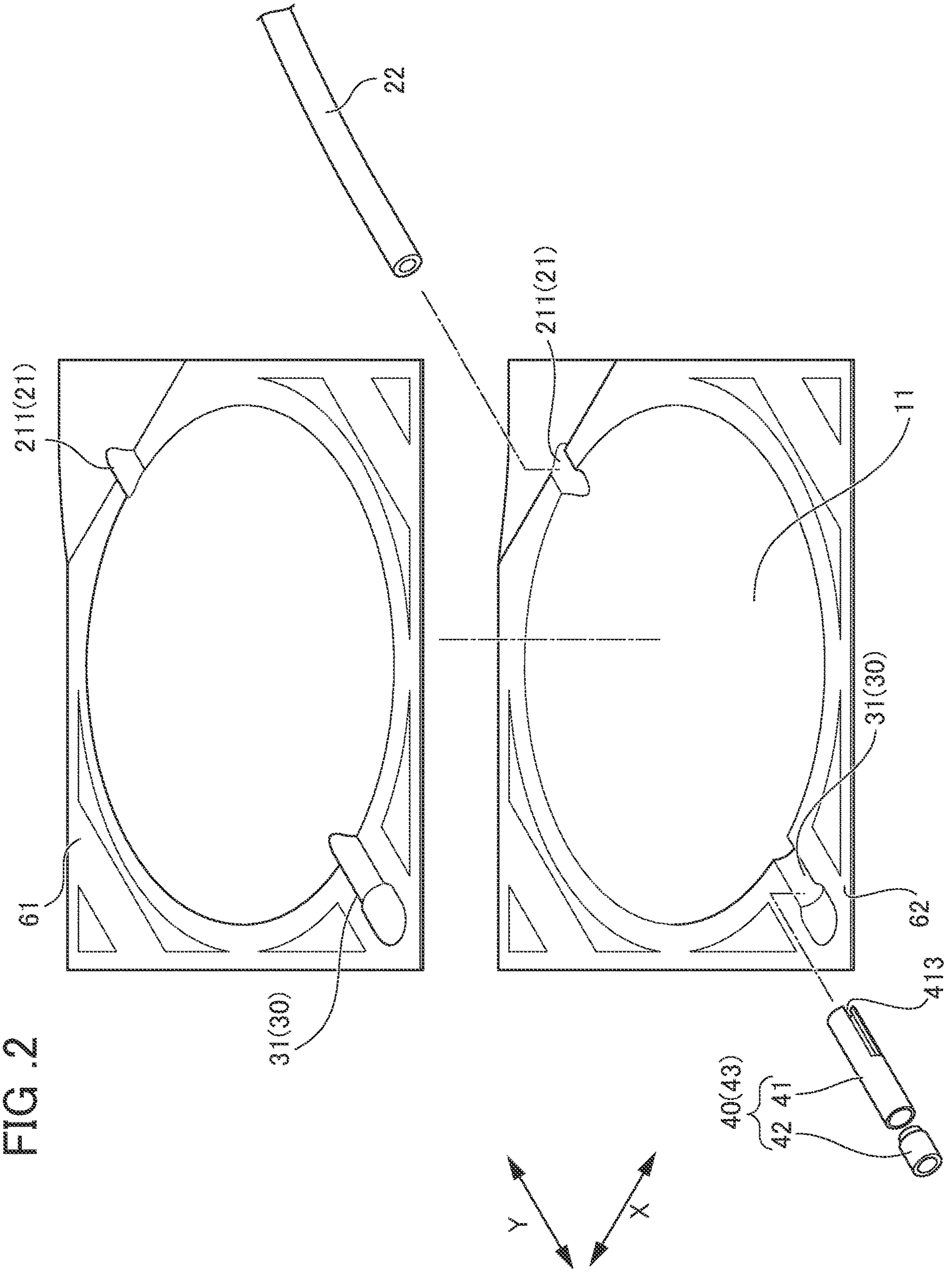
FIG. 2 is an exploded perspective view of the liquid storage container according to the first embodiment.
Figure 3:
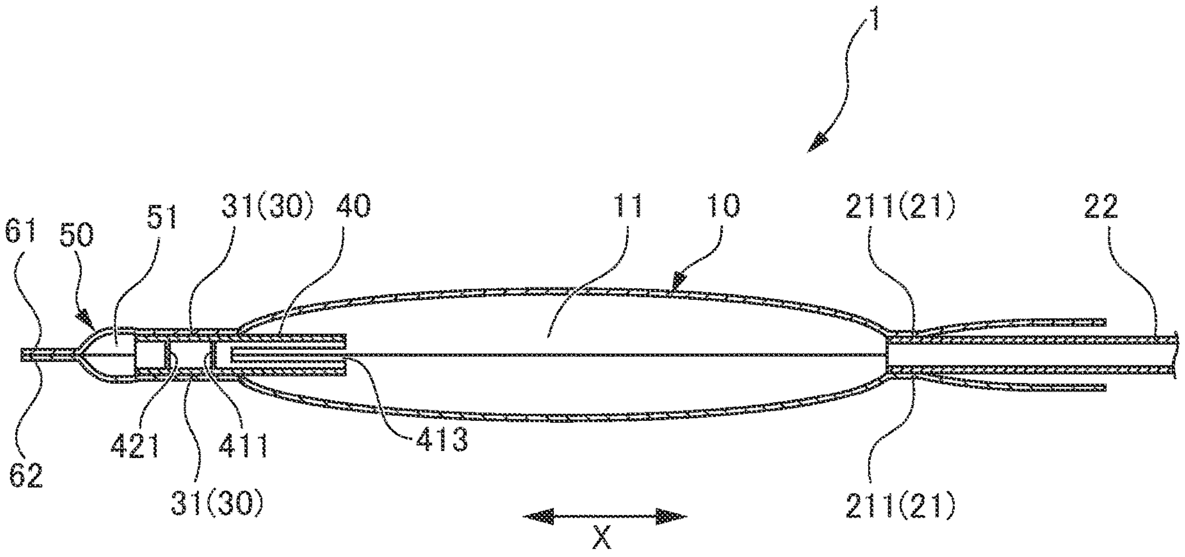
FIG. 3 is a cross-sectional view taken along the line A-A of FIG. 1.

As shown in FIGS. 1 to 3, the liquid accommodation portion 10 is formed by stacking a pair of sheet-shaped members 61 and 62 and joining most of the peripheral edge portions of the sheet-shaped members 61 and 62. The liquid accommodation portion 10 has a liquid accommodation space 11, which is a space surrounded by sheet-shaped members 61 and 62 having peripheral edge portions joined to each other. In the first embodiment, as shown in FIG. 1, the liquid accommodation portion 10 has a circular shape in a plan view.

The liquid introduction portion 20 is used for introducing a liquid into the liquid accommodation portion 10. The liquid introduction portion 20 includes a liquid introduction path 21 and a liquid introduction tube 22 provided in the liquid introduction path 21. The liquid introduction path 21 is provided in each of the sheet-shaped members 61 and 62, and includes a liquid introduction groove 211 extending outward from the liquid accommodation portion 10. The liquid introduction groove 211 has one end portion which is continuous with the liquid accommodation space 11. The liquid introduction groove 211 also has the other end portion which extends to an edge portion of each of the sheet-shaped members 61 and 62 (an outer edge of a portion where the sheet-shaped members 61 and 62 are joined).

The liquid introduction tube 22 is provided in the liquid introduction path 21. The liquid introduction tube 22 guides a liquid such as a cell collected from a biological sample to the liquid accommodation portion 10 in a sterile and airtight state. The liquid introduction tube 22 is made of thermoplastic resin such as EVA resin. In the first embodiment, the liquid introduction tube 22 is provided in the liquid introduction groove 211 provided in the sheet-shaped members 61 and 62 such that one end of the liquid introduction tube 22 communicates with the liquid accommodation space 11. A tube clip 23 for opening and closing a flow path of the liquid introduction tube 22 is attached to the liquid introduction tube 22. Further, a connection port 24 to which an instrument such as a syringe used for introducing a cell into the liquid storage container 1 can be connected is attached to the tip portion of the liquid introduction tube 22.

The liquid discharge portion 30 is used to discharge the liquid accommodated in the liquid accommodation portion 10. The liquid discharge portion 30 is provided at a position opposed to a position where the liquid introduction portion 20 is provided in the circular liquid accommodation portion 10. The liquid discharge portion 30 includes a recessed groove 31. The recessed groove 31 is provided in each of the sheet-shaped members 61 and 62, and extends to the outside of the liquid accommodation portion 10. The liquid discharge portion 30 has one end portion which is continuous with the liquid accommodation space 11.

The puncture port 40 is provided in the liquid discharge portion 30. The puncture port 40 includes a cylindrical port main body portion 43, a first partition 411, and a second partition 421. In the first embodiment, the puncture port 40 includes a first port member 41 and a second port member 42.

The first port member 41 has a cylindrical shape. The first port member 41 has a pair of slits 413 extending in the longitudinal direction of the first port member 41 at one end of the first port member 41. The first port member 41 is provided such that the one end of the first port member 41 where the pair of slits is provided adjacent to the liquid accommodation portion 10. The first port member 41 includes the first partition 411 that is provided closer to the other end of the first port member 41 than the portion of the first port member 41 where the pair of slits is provided, and closes the cylindrical portion (refer to FIGS. 5A to 5D, 11A to 11E, etc.). The first port member 41 is provided such that the pair of slits 413 is positioned in the middle in the thickness direction of the liquid accommodation portion 10. With such a configuration, the portions of the first port member 41 where the pair of slits 413 is not provided are arranged so as to overlap the inside of the sheet-shaped members 61 and 62 of the liquid accommodation portion 10, respectively. Therefore, when a puncture instrument 200 described later is inserted into the puncture port 40, it is possible to prevent the sheet-shaped members 61 and 62 from being erroneously broken by the tip of the puncture instrument 200.

The second port member 42 has a cylindrical shape, and has one end portion closed by the second partition 421 (see FIGS. 5A to 5D, 11A to 11E, etc.). The second port member 42 includes a small diameter portion 422 provided at one end and a large diameter portion 423 provided at the other end. The small diameter portion 422 has an outer diameter substantially equal to the inner diameter of the first port member 41. The large diameter portion 423 has substantially the same diameter as the inner diameter and the outer diameter of the first port member 41. The small diameter portion 422 of the second port member 42 is inserted into the other end portion of the first port member 41 such that the second partition 421 is positioned inside the first port member 41.

The puncture port 40 (the port main body portion 43) is provided in the liquid discharge portion 30 in a state where the second port member 42 is inserted into the first port member 41. In the present embodiment, a portion of the second port member 42 (a portion of the port main body portion 43) projects outward from the liquid discharge portion 30. A portion of the second port member 42 (a portion of the port main body portion 43) may not protrude outward from the liquid discharge portion 30. The first port member 41 and the second port member 42 of the puncture port 40 are made of a thermoplastic resin such as EVA resin.

In the puncture port 40, the distance D between the first partition 411 and the second partition 421 is set longer than the length HL of an opening portion 220 of a through hole 215 provided in a needle tube portion 210 of the puncture instrument 200 to be inserted into the puncture port 40 (see FIG. 11). The relationship between the distance D and the length HL of the opening portion 220 will be described later.

The inner diameter of the first port member 41 and the inner diameter of the second port member 42 (the inner diameter of the large diameter portion 423 and the inner diameter of the small diameter portion 422) are larger than the outer diameter of the insertion portion of the puncture instrument. With such a configuration, it is possible to reduce the contact area between the inner peripheral surface of the puncture port 40 and the outer peripheral surface of the insertion portion of the puncture instrument. Therefore, it is possible to reduce the puncture resistance when the puncture instrument is punctured in the puncture port 40.

The puncture port accommodation portion 50 includes a portion in which the sheet-shaped members 61 and 62 of the liquid accommodation portion 10 extend toward the liquid discharge portion 30. The sheet-shaped members 61 and 62 extend beyond the outer end portion (the other end portion) of the second port member 42 of the puncture port 40 (the port main body portion 43). Further, the extended portions of the sheet-shaped members 61 and 62 are joined by welding the peripheral portion of the puncture port 40 in a plan view, i.e., the outer side of the portion separated from the puncture port 40 by a predetermined distance, whereby the puncture port accommodation portion 50 having the puncture port accommodation space 51 surrounded by the sheet-shaped members 61 and 62 is formed. By forming the puncture port accommodation portion 50, as described later, it is possible to maintain the sterility of the puncture port 40 until the puncture port accommodation portion 50 is opened (cut in the width direction X) and the puncture port 40 is punctured with a puncture instrument such as a bottle needle and connected with each other.

From the viewpoint of maintaining the strength of the liquid storage container 1 and suitably opening the opening portion of the puncture port accommodation portion 50, it is preferable to use an EVA resin (ethylene-vinyl acetate copolymer resin) having flexibility and elasticity as the sheet-shaped members 61 and 62. The thickness of the sheet-shaped members 61 and 62 is preferably 0.2 mm to 0.7 mm, and more preferably 0.35 mm to 0.5 mm.

In addition, by forming the sheet-shaped members 61 and 62 and the puncture port 40 with the same material, when the sheet-shaped members 61 and 62 and the puncture port 40 are stored at a low temperature, such as by cryopreservation, the deformation characteristics of the sheet-shaped members 61 and 62 and the puncture port 40 become the same, so that it is possible to enhance the sealing performance between the partitions in the puncture port 40 and the sealing performance of the liquid accommodation space 11. Further, it is possible to improve the weldability.

In the first embodiment, as shown in FIG. 1, the edge portion of the puncture port accommodation space 51 is formed in a curved shape having no corner portion in the vicinity of the puncture port 40. By forming the edge portion of the puncture port accommodation space 51 in a curved shape having no corner portion in the vicinity of the puncture port 40, when the liquid storage container 1 is sterilized using the ethylene oxide gas (EOG), it is possible to suppress the concentration of force at one point of the edge portion of the puncture port accommodation space 51 in a state where the EOG penetrates the puncture port accommodation space 51 and the puncture port accommodation space 51 expands.

Next, a method of manufacturing the liquid storage container 1 of the first embodiment will be described with reference to FIGS. 4A to 5D. FIGS. 4A to 4D are exploded perspective views in the manufacturing process of the liquid storage container 1, and FIGS. 5A to 5D are schematic cross-sectional views in the manufacturing process of the puncture port 40.

Figure 4A:
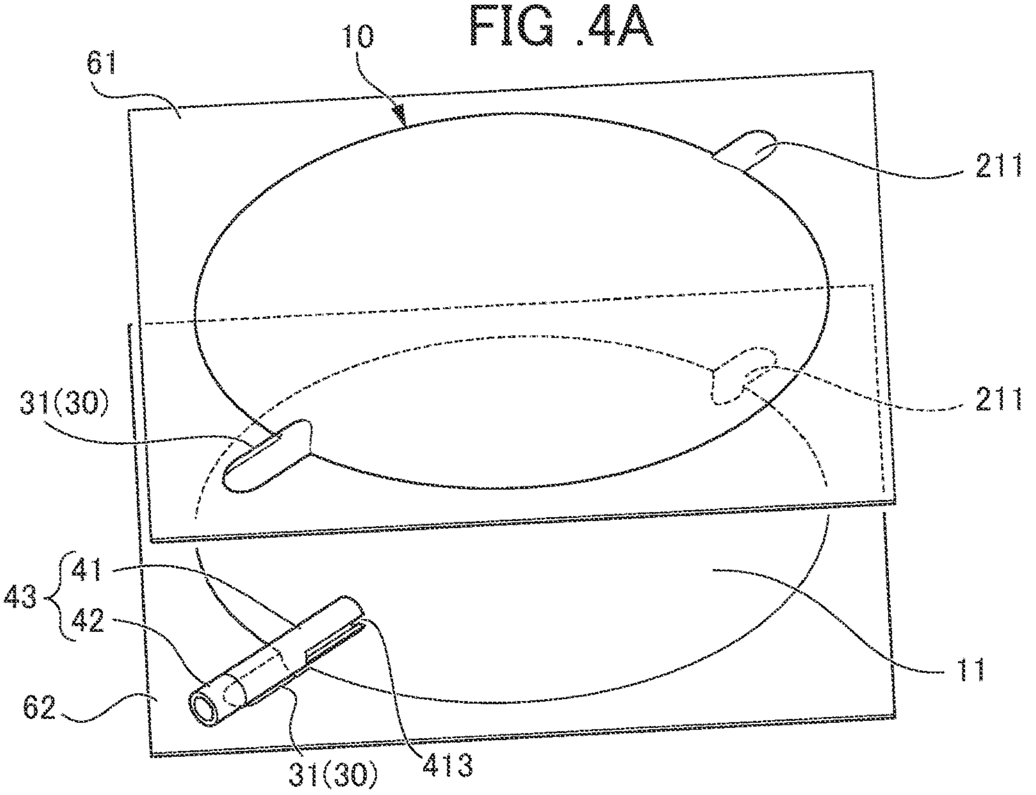
FIG. 4A is a view of a manufacturing step of the puncture port and the liquid storage container, and is a view of a step of overlapping a pair of sheet-shaped members having a three-dimensional shape in a state in which a port main body portion is provided in a recessed groove.

First, as shown in FIG. 4A, the liquid introduction groove 211 and the recessed groove 31 corresponding to the shape of the liquid discharge portion 30 are formed in the sheet-shaped members 61 and 62 by three-dimensional molding. In the first embodiment, three-dimensional shapes having the same shape are formed on the sheet-shaped members 61 and 62, respectively.

Figure 5A:
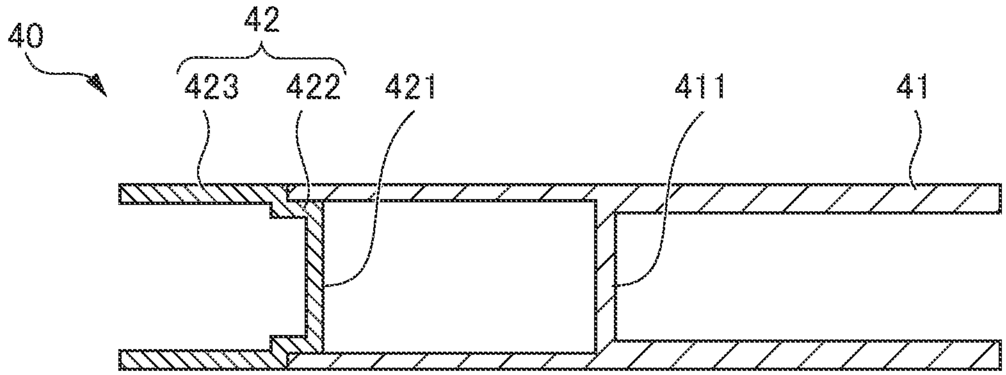
FIG. 5A is a schematic cross-sectional view of a manufacturing step of the puncture port, and is a diagram illustrating a step of inserting a portion of a second port member into a first port member.
Figure 5B:
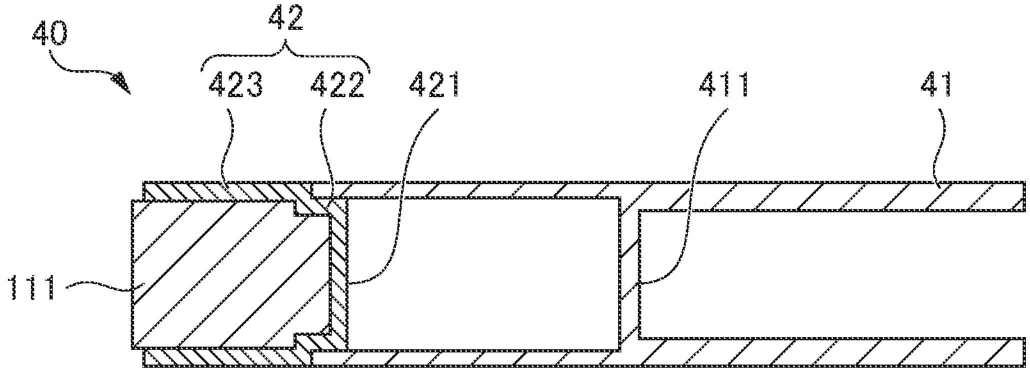
FIG. 5B is a view of a state in which a welding pin is inserted into the second port member from the state shown in FIG. 5A.
Figure 5C:
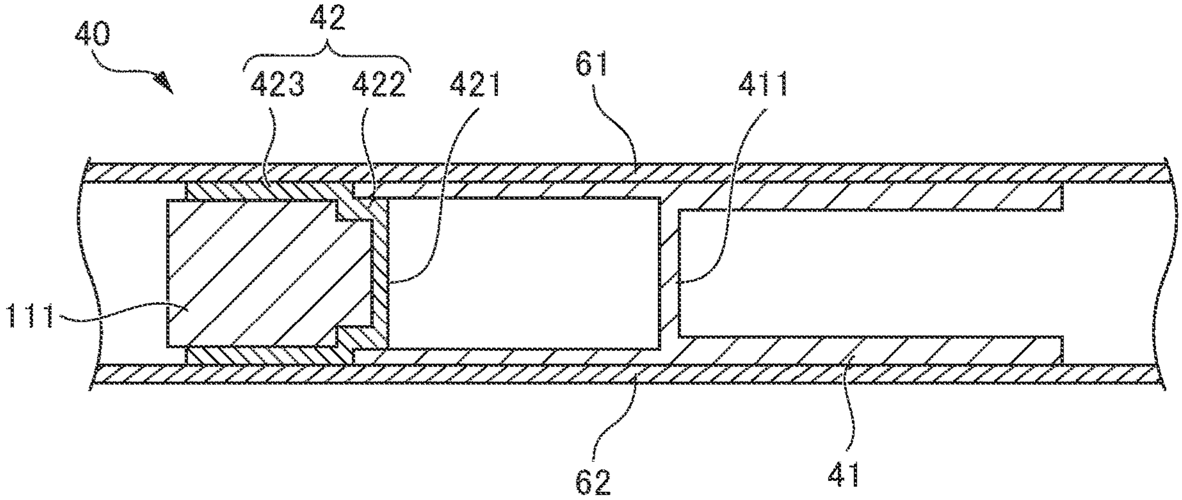
FIG. 5C is a diagram for explaining a providing step of providing the first port member and the second port member between a pair of sheet-shaped members which are overlapped in an opposite manner from the state shown in FIG. 5B.
Figure 5D:
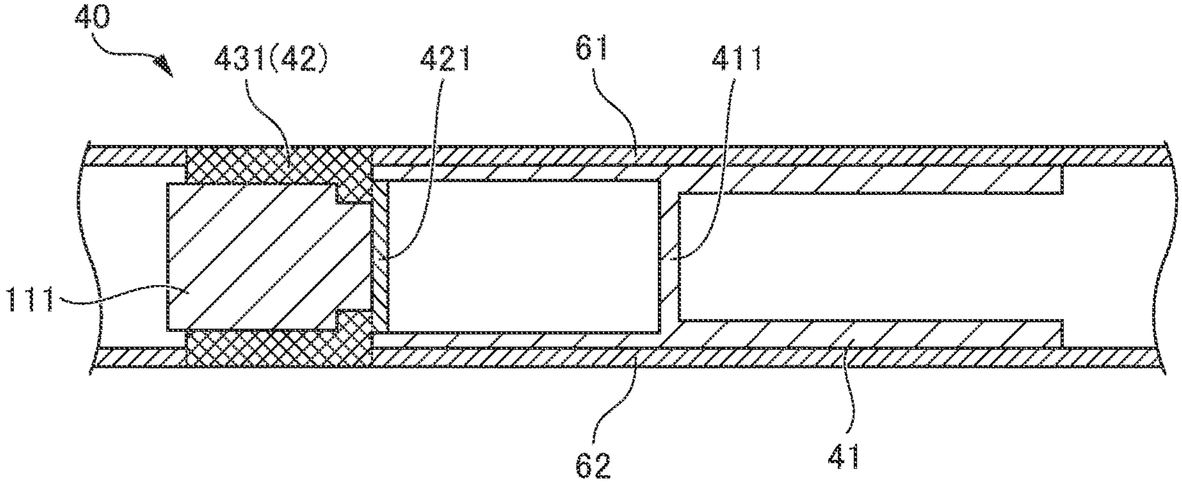
FIG. 5D is a diagram for explaining a welding step of welding a portion where the second port member and the set of sheet-shaped members overlap with each other and a portion where the first port member, the second port member and the set of sheet-shaped members overlap with each other from the state shown in FIG. 5C.

Next, the second port member 42 is inserted into the first port member 41 (insertion step, see FIG. 5A). Next, a welding pin 111 is inserted into the second port member 42, and in this state (see FIG. 5B), the first port member 41 and the second port member 42 are provided in the recessed groove 31 of one of the sheet-shaped members (the sheet-shaped member 62), and then the other of the sheet-shaped members (the sheet-shaped member 61) is superimposed or overlapped on the one of the sheet-shaped members so that the positions of the liquid introduction groove 211 and the liquid discharge portion 30 match with each other (providing step, refer to FIG. 5C).

In the step of inserting the second port member 42 into the first port member 41 and inserting the welding pin 111 into the second port member 42, any order may be used. That is, in the providing step, it suffices if the first port member 41 and the second port member 42 are provided in the recessed groove 31 in a state in which the second port member 42 is inserted into the first port member 41 and the welding pin 111 is provided in the second port member 42. The welding pin 111 is configured to contact the entire inner wall of the second port member 42. Alternatively, the welding pin 111 may be configured to contact only the three-layer structure portion on the inner wall of the second port member 42 (the portion where the second port member 42, the second port member 42, and the sheet-shaped members 61 and 62 overlap each other in the thickness direction), and only the three-layer structure portion may be welded.

Figure 4B:
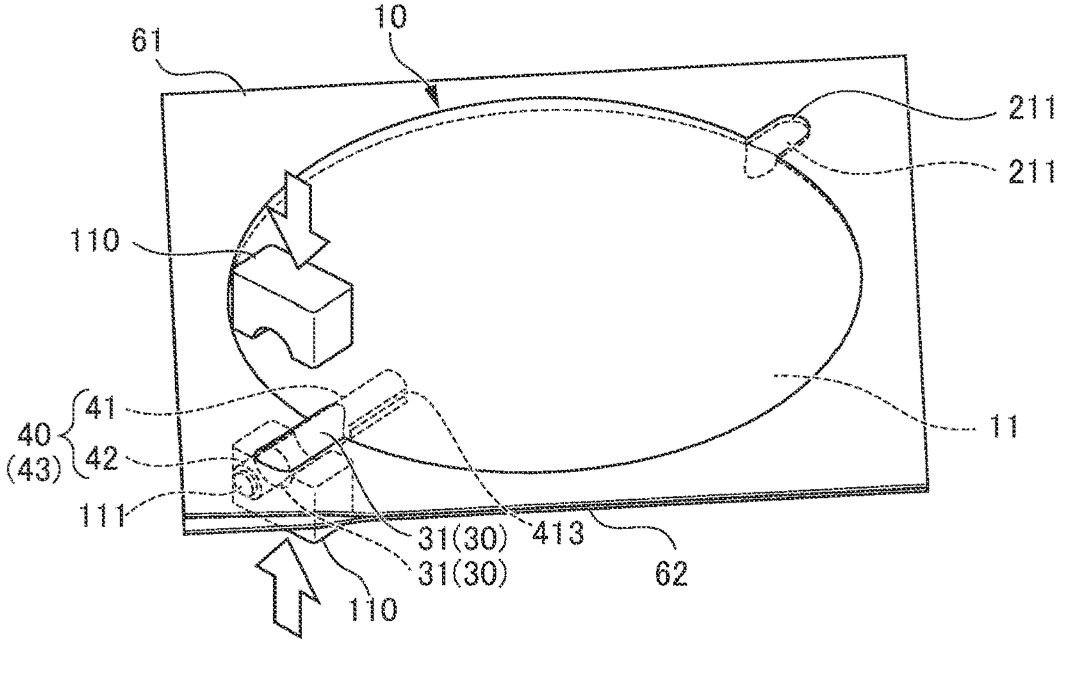
FIG. 4B is a view of a step of welding the vicinity of the port main body portion from the state shown in FIG. 4A.

Next, as shown in FIG. 4B, the overlapped sheet-shaped members 61 and 62, and the first port member 41 and the second port member 42 provided between the sheet-shaped members 61 and 62 are sandwiched and welded by the welding pins 111 and welding molds 110 and 110 at the liquid discharge portion 30 and in the vicinity of the liquid discharge portion 30. The welding mold 110 is provided to weld the boundary portion between the first port member 41 and the second port member 42. With such a configuration, the sheet-shaped members 61 and 62 and the port main body portion 43 provided between the sheet-shaped members 61 and 62 are welded to each other at the liquid discharge portion 30 and in the vicinity of the liquid discharge portion 30, whereby a welded portion 431 is formed (see FIGS. 4C and 5D).

Figure 4C:
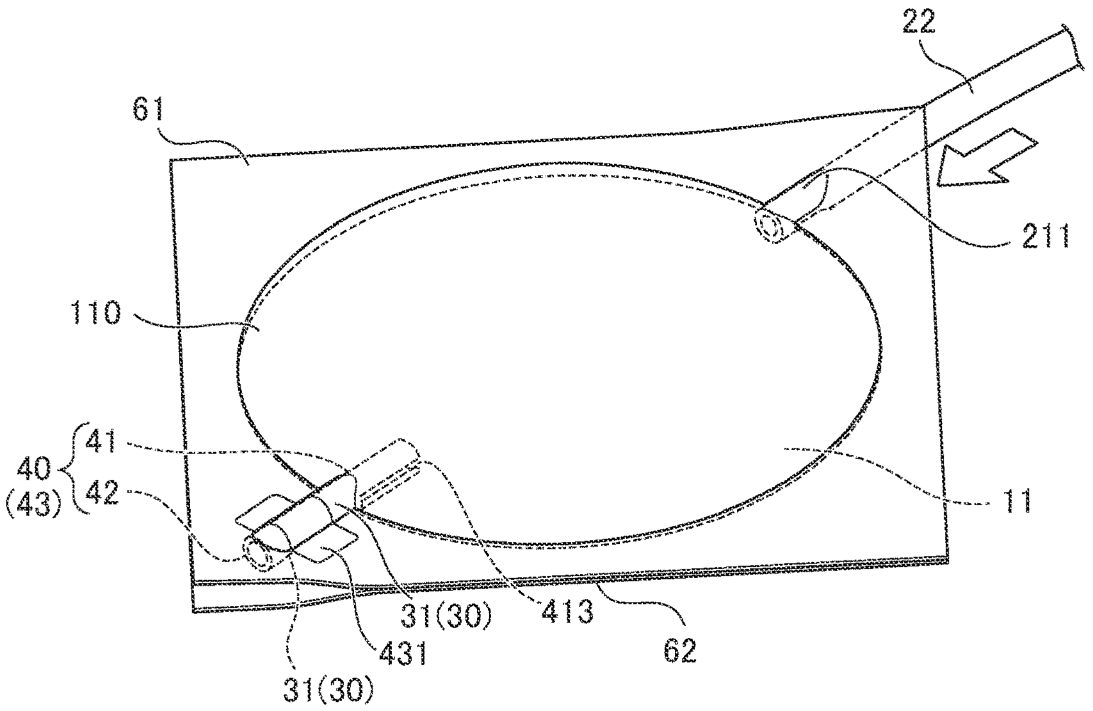
FIG. 4C is a view of a step of providing a liquid introduction tube in a liquid introduction portion from the state shown in FIG. 4B.

Next, as shown in FIG. 4C, the liquid introduction tube 22 in which a pin is inserted is provided in the portions of the sheet-shaped members 61 and 62 in which the liquid introduction grooves 211 are provided.

Figure 4D:
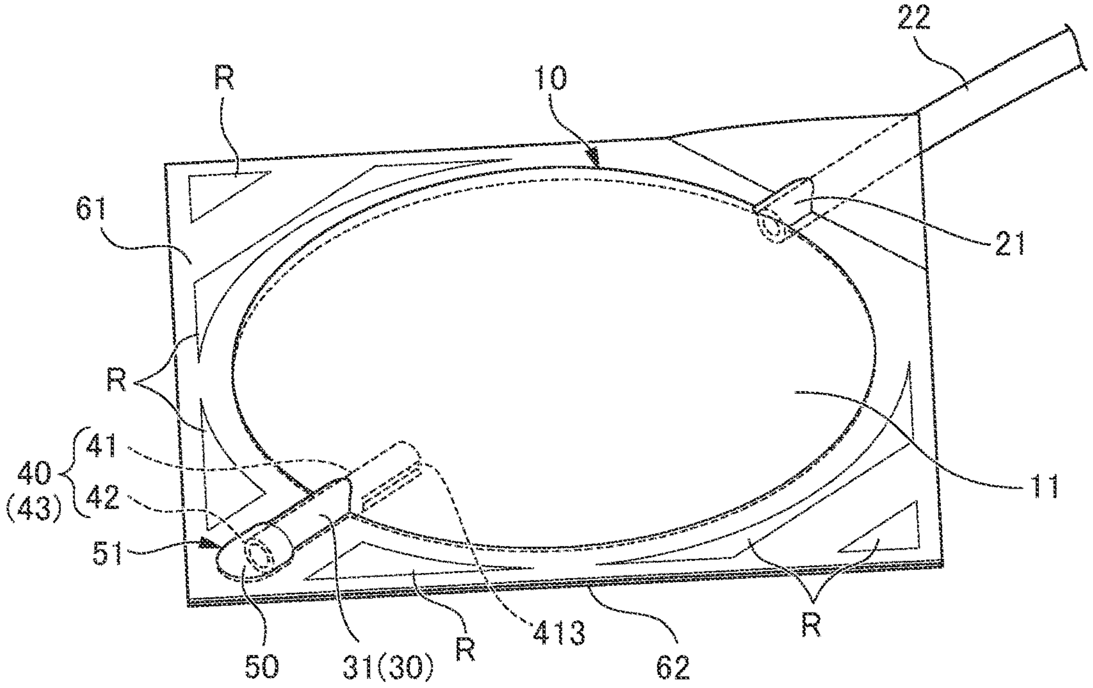
FIG. 4D is a view of a step of forming a liquid storage container having a liquid accommodation portion and a puncture port accommodation portion by high-frequency welding (thermal welding) of a peripheral edge portion of a set of sheet-shaped members from the state shown in FIG. 4C.

Next, as shown in FIG. 4D, in a state in which the sheet-shaped members 61 and 62 are overlapped so that the positions of the liquid introduction groove 211 and the liquid discharge portion 30 match with each other, the peripheral edge portions of the sheet-shaped members 61 and 62 which are located outside the portion forming the liquid accommodation portion 10 are joined by high-frequency welding (thermal welding) to form the liquid accommodation portion 10 (liquid accommodation portion forming step), and the peripheral edge portions of the puncture port 40 is joined by high-frequency welding (thermal welding) to form the puncture port accommodation portion 50. Further, the liquid introduction tube 22 is welded to the sheet-shaped members 61 and 62 to form the liquid introduction path 21. At this time, a region R where high-frequency welding (thermal welding) is not performed may be provided in a portion of the portion located outside the liquid accommodation portion 10.

Thus, the liquid storage container 1 having the liquid accommodation portion 10 and the puncture port accommodation portion 50 is manufactured. Here, in the first embodiment, although the three-dimensional molding is not performed on the portions of the sheet-shaped members 61 and 62 corresponding to the liquid accommodation portion 10 and the puncture port accommodation portion 50, the sheet-shaped member 61 and the sheet-shaped member 62 are joined to each other in a state in which the puncture port 40 having a predetermined diameter (thickness) is sandwiched therebetween, so that the liquid accommodation space 11 and the puncture port accommodation space 51 each having a predetermined volume are formed between the sheet-shaped member 61 and the sheet-shaped member 62.

The liquid storage container 1 is then subjected to an EOG sterilization treatment. In the EOG sterilization process, in a state in which the liquid storage container 1 is provided inside the sterilizer, the EOG is introduced into the sterilizer at a predetermined pressure to sterilize the outer surface of the liquid storage container 1, and at the same time, the EOG penetrates into the liquid accommodation space 11 and the puncture port accommodation space 51, so that the inside of the liquid accommodation portion 10 and the inside of the puncture port accommodation portion 50 are also sterilized.

In the first embodiment, by forming the edge portion of the puncture port accommodation space 51 in a curved shape having no corner portion in the vicinity of the puncture port 40, it is possible to suppress concentration of a force at one point of the edge portion of the puncture port accommodation space 51 in a state where the EOG penetrates into the puncture port accommodation space 51 and the puncture port accommodation space 51 expands in the EOG sterilization step. This prevents the puncture port accommodation portion 50 from being damaged in the EOG sterilization step.

It is possible to manufacture the puncture port 40 and the liquid storage container 1 according to the first embodiment by the manufacturing method described above. Instead of integrally forming the puncture port 40 and the liquid storage container 1, the first port member 41 and the second port member 42 may be inserted by the above-described insertion step and joined with each other by welding to manufacture the puncture port 40. In this case, a sealed space is formed between the first partition 411 and the second partition 421 by welding a portion where the two layers of the first port member 41 and the second port member 42 overlap.

Figure 6A:
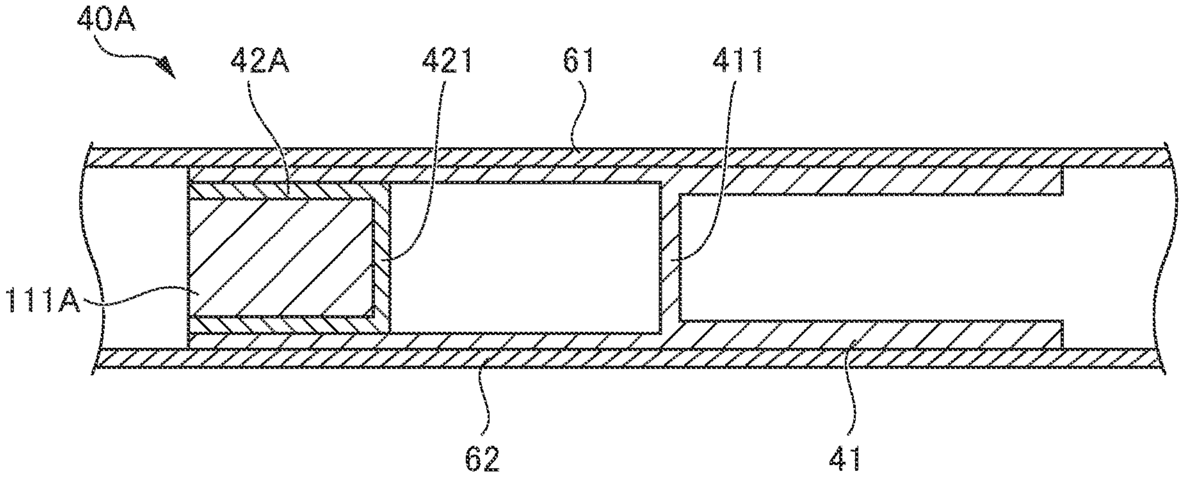
FIG. 6A is an explanatory diagram of a modified example of the puncture port according to the first embodiment.
Figure 6B:
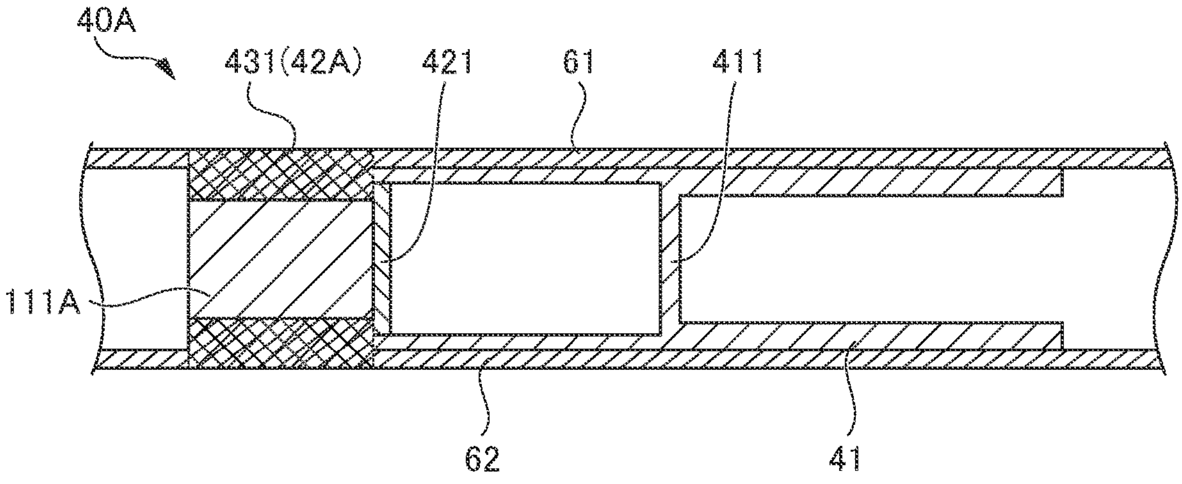
FIG. 6B is a diagram of a state in which a portion where the first port-shaped member, the second port-shaped member, and the pair of sheet-shaped members shown in FIG. 6A are overlapping each other is welded.

Next, a modified example of the shape of the puncture port according to the first embodiment is shown in FIGS. 6A and 6B. A puncture port 40A shown in FIG. 6 differs from the puncture port 40 of the first embodiment in the shape of a second port member 42A. In the modified example, the second port member 42 has a cylindrical shape and has an outer diameter substantially equal to the inner diameter at the other end of the first port member 41.

In the modified example, as shown in FIG. 6A, in the above-described insertion step, the entire second port member 42A is inserted into the first port member 41. In the second port member 42A, a welding pin 111A having a shape in contact with the entire inner wall is inserted. In this case, the second port member 42A is not directly joined to the sheet-shaped members 61 and 62, but is joined via the first port member 41. When only the puncture port 40A is manufactured, the overlapping portion of the first port member 41 and the second port member 42A is welded to form a sealed space between the first partition 411 and the second partition 421.

Next, a method of using the liquid storage container 1 of the first embodiment will be described with reference to FIGS. 7 to 11.

Figure 7:
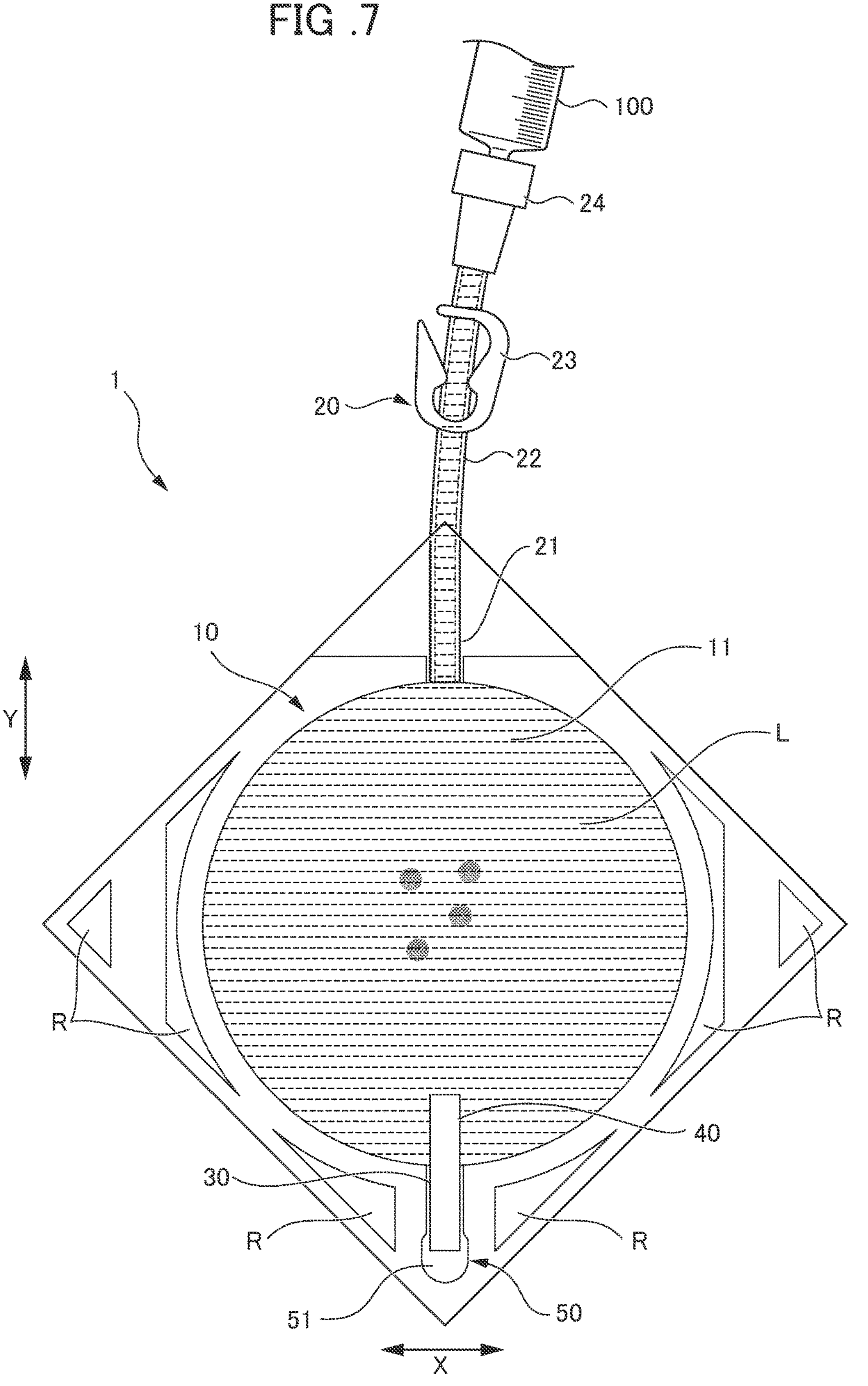
FIG. 7 is a diagram of a procedure of using the liquid storage container according to the first embodiment and of a state in which the liquid is stored in the liquid storage container.
Figure 8:
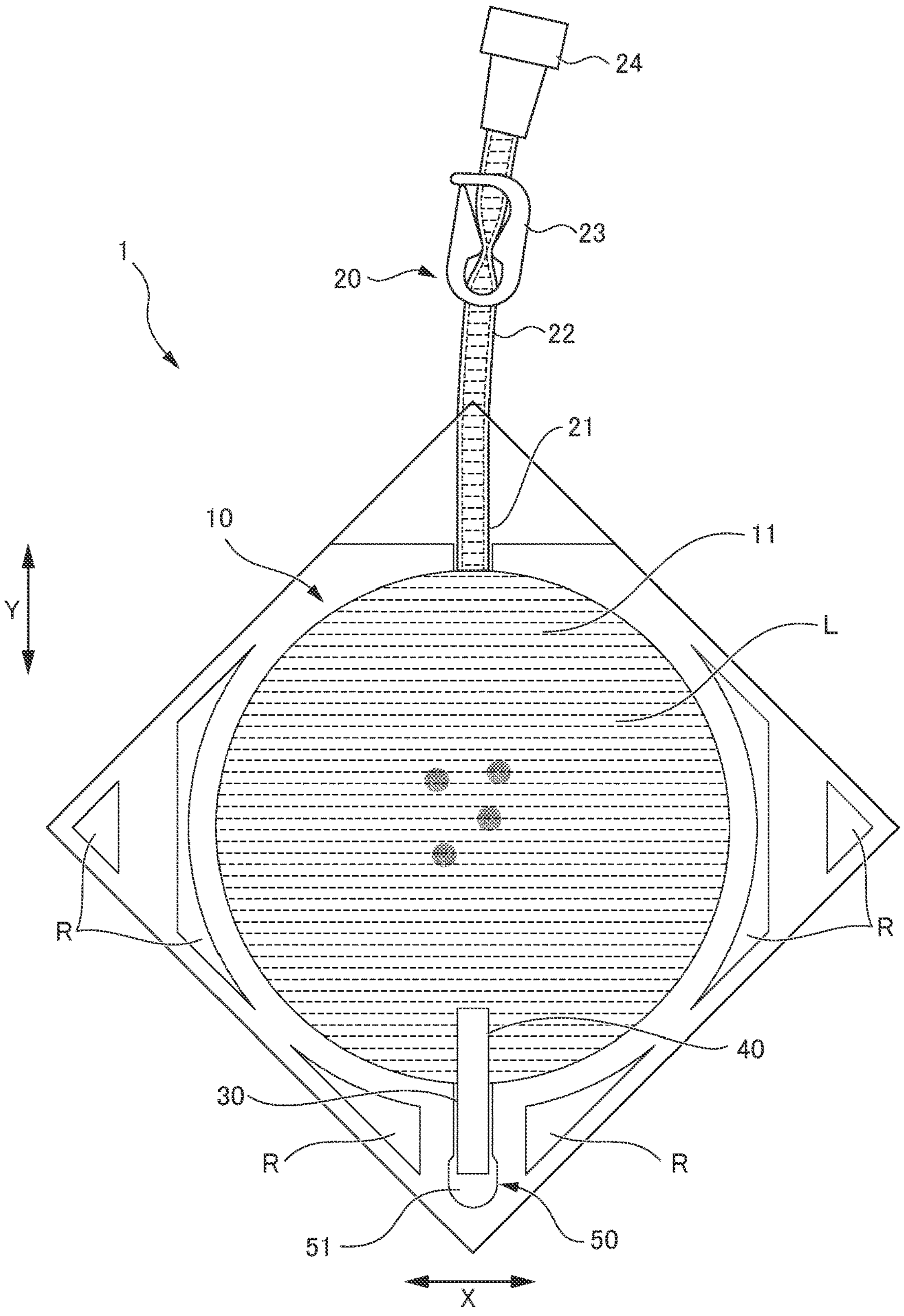
FIG. 8 is a view of a state in which a liquid is accommodated in a liquid accommodation portion from the state shown in FIG. 7.
Figure 9:
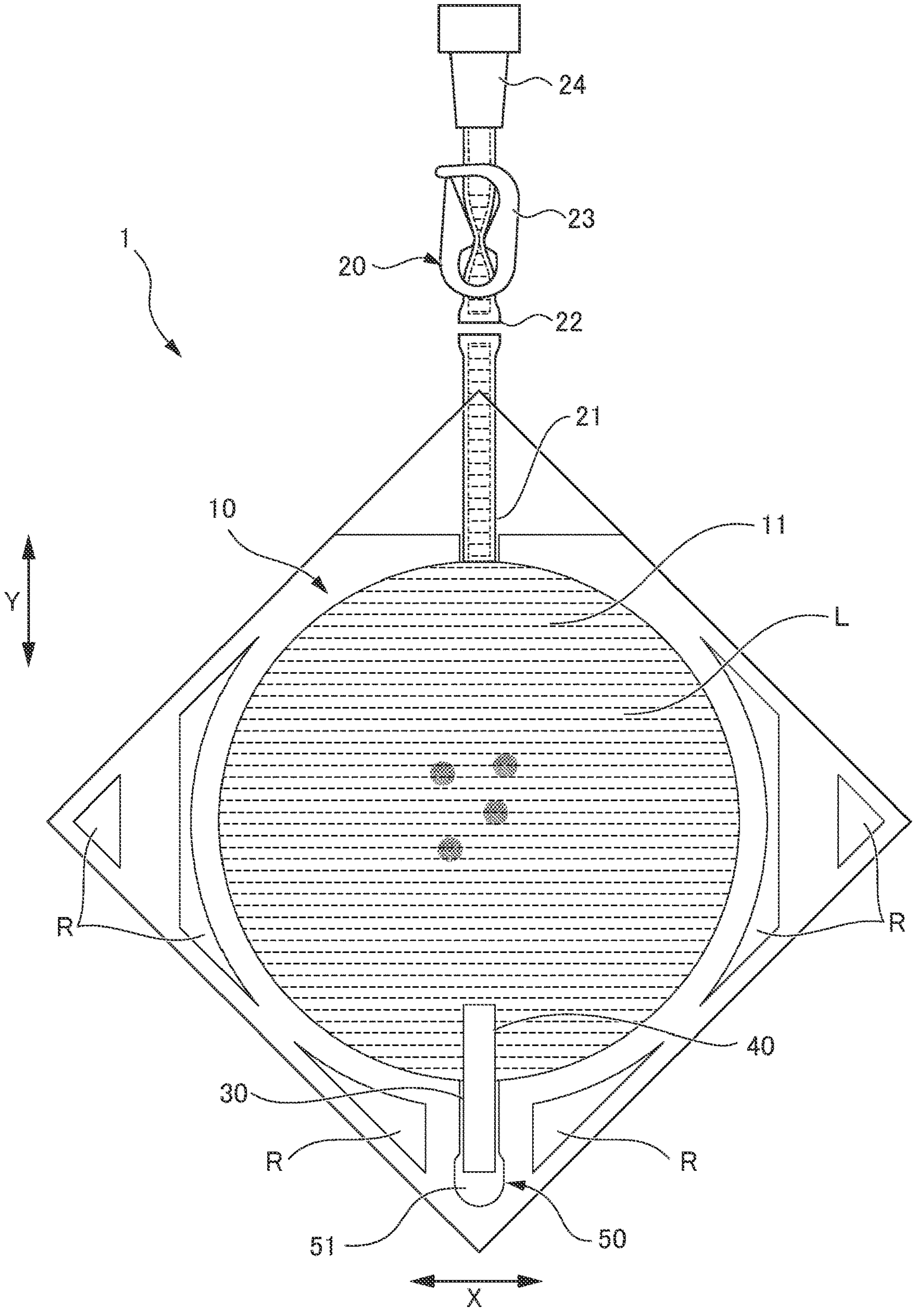
FIG. 9 is a view of a state in which the liquid introduction tube is fused from the state shown in FIG. 8.

When the liquid is accommodated in the liquid storage container 1, as shown in FIG. 7, the liquid L is introduced into the liquid accommodation portion 10 through the liquid introduction tube 22 by an instrument 100 such as a syringe. After the liquid L is accommodated in the liquid accommodation portion 10, as shown in FIG. 8, the flow path of the liquid introduction tube 22 is closed by the tube clip 23. Next, as shown in FIG. 9, the liquid introduction tube 22 is fused on the side of the tube clip 23 adjacent to the liquid accommodation portion 10, whereby the liquid storage container 1 is sealed. In this state, the liquid storage container 1 is stored.

Figure 10:
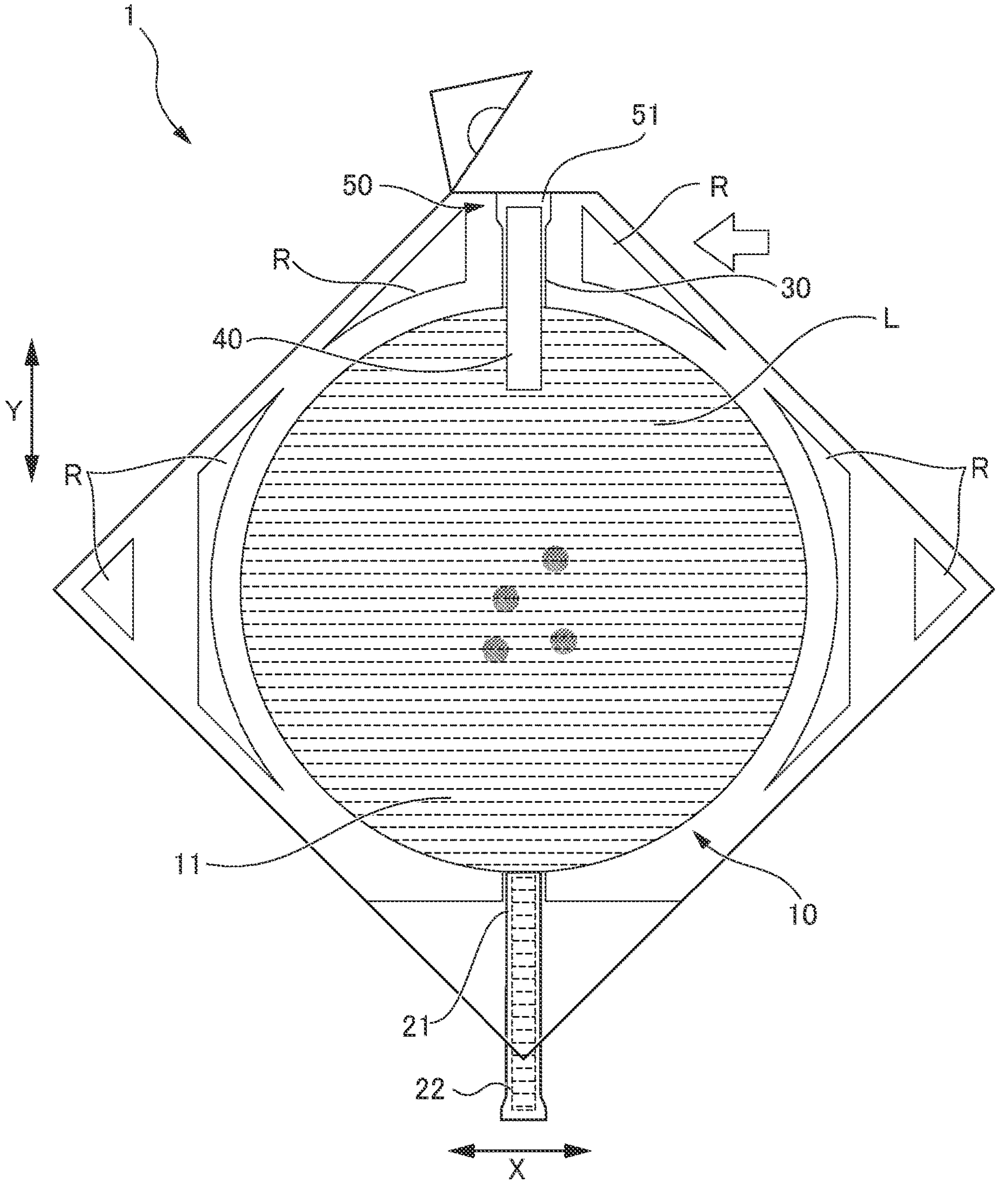
FIG. 10 is a view of a state in which cells accommodated in the liquid accommodation portion are taken out, and of a state in which the puncture port accommodation portion is opened (cut).

When the liquid accommodated in the stored liquid storage container 1 is used, as shown in FIG. 10, an end portion of the puncture port accommodation portion 50 in the Y direction is cut by scissors or the like in the width direction X. Then, due to the elasticity of the flexible sheet-shaped members 61 and 62, the cut portion of the puncture port accommodation portion 50 opens in the thickness direction of the sheet-shaped members 61 and 62. In this state, the tip portion of the puncture instrument 200 such as a bottle needle is inserted into the puncture port 40, and the liquid accommodated in the liquid accommodation portion 10 is collected.

Figure 11A:
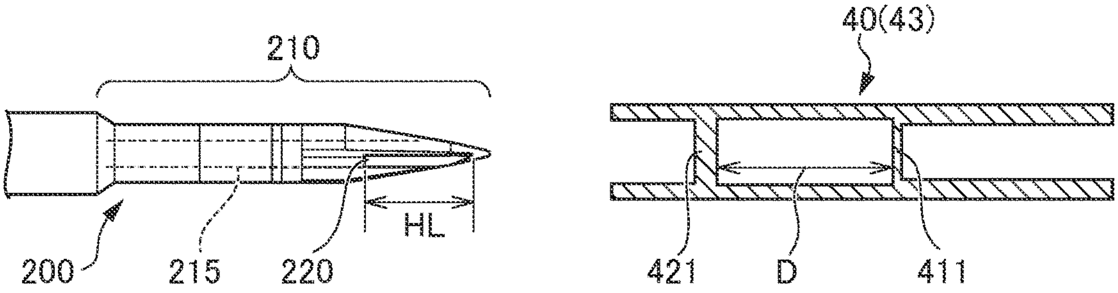
FIG. 11A is an explanatory diagram when the puncture instrument is punctured in the puncture port according to the first embodiment of the present invention.

A state in which the puncture instrument 200 punctures the puncture port 40 will be described in detail with reference to FIG. 11. In the present embodiment, a case where a bottle needle is used as the puncture instrument 200 will be described. The puncture instrument 200 has the needle tube portion 210 to be inserted into the puncture port 40, as shown in FIG. 11A. The needle tube portion 210 has a through hole 215 penetrating in the longitudinal direction. Further, the tip end side of the needle tube portion 210 has a tapered surface having a predetermined slope angle, and the needle tube portion 210 has the through hole 215 opened on the tapered surface. The opening portion 220 of the through hole 215 in the needle tube portion 210 has a predetermined length HL in the puncture direction of the puncture instrument 200. The puncture port 40 includes the two partitions, of the first partition 411 and the second partition 421 thereinside, and is configured such that a distance D between the two partitions is longer than the length HL of the opening portion 220.

Specifically, when a bottle needle is used as the puncture instrument 200, the length HL of the opening portion 220 of the through hole 215 of the bottle needle is set to 11.5 mm to 13.4 mm. Therefore, the distance D between the first partition 411 and the second partition 421 in the puncture port 40 is preferably set to 13.5 mm to 26 mm.

Figure 11B:
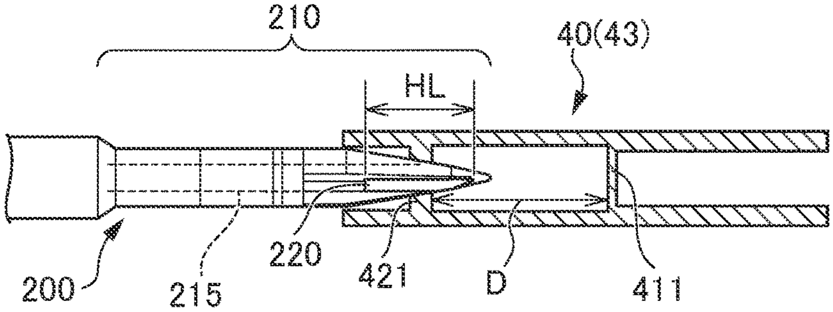
FIG. 11B is an explanatory diagram when the puncture instrument is punctured in the puncture port according to the first embodiment of the present invention.

FIG. 11B shows a state in which the puncture instrument 200 begins to be inserted into the puncture port 40 from the state shown in FIG. 11A, and the tip portion of the puncture instrument 200 is in the middle of passing through the second partition 421. In this state, the base end side of the opening portion 220 of the through hole 215 is located outside the second partition 421 and the tip end side is located inside the second partition 421 (between the first partition 411 and the second partition 421). Therefore, even if the sealing performance of the space between the first partition 411 and the second partition 421 is temporarily lost, the sealing performance of the space closer to the liquid accommodation portion 10 than the first partition 411 is maintained.

Figure 11C:
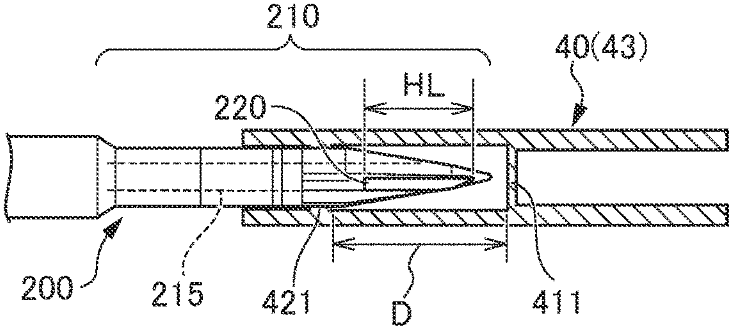
FIG. 11C is an explanatory diagram when the puncture instrument is punctured in the puncture port according to the first embodiment of the present invention.

FIG. 11C shows a state in which the puncture instrument 200 is further inserted from the state shown in FIG. 11B, and the opening portion 220 of the through hole 215 is located between the first partition 411 and the second partition 421. In this state, since the entire opening portion 220 of the through hole 215 is inserted between the first partition 411 and the second partition 421, and the penetrated portion of the second partition 421 is closed by the puncture instrument 200, the space between the first partition 411 and the second partition 421 is sealed again.

Figure 11D:
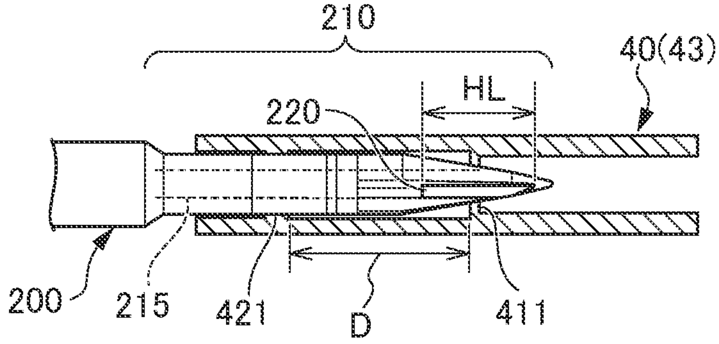
FIG. 11D is an explanatory diagram when the puncture instrument is punctured in the puncture port according to the first embodiment of the present invention.

FIG. 11D shows a state in which the puncture instrument 200 is further inserted from the state shown in FIG. 11C and the tip portion of the puncture instrument 200 is in the middle of passing through the first partition 411. In this state, since the base end side of the opening portion 220 of the through hole 215 is located between the first partition 411 and the second partition 421, and the tip end side is located on the inner side of the first partition 411 (the side adjacent to the liquid accommodation portion 10), the space between the first partition 411 and the second partition 421 and the liquid accommodation portion 10 communicate with each other. However, since the penetrated portion of the second partition 421 is closed by the puncture instrument 200, the sealing performance of the space on the inner side from the second partition 421 is maintained.

Figure 11E:
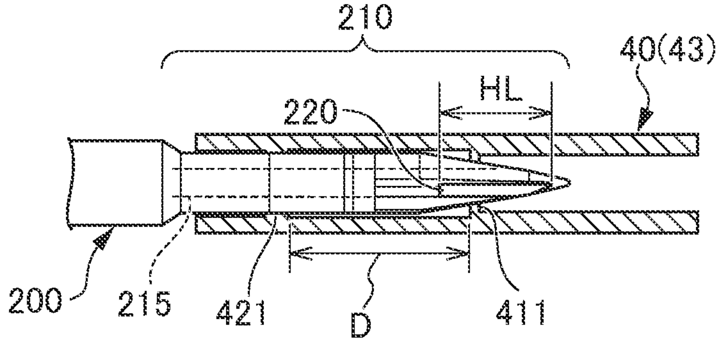
FIG. 11E is an explanatory diagram when the puncture instrument is punctured in the puncture port according to the first embodiment of the present invention.

FIG. 11E shows a state in which the puncture instrument 200 is further inserted from the state shown in FIG. 11D, and the tip portion of the puncture instrument 200 penetrates the first partition 411. In this state, since the majority of the opening portion 220 of the through hole 215 is located closer to the liquid accommodation portion 10 than the first partition 411, it is possible to take out the liquid favorably while maintaining the sealing performance in the liquid accommodation portion 10.

According to the puncture port 40 and the liquid storage container 1 of the first embodiment described above, the following advantageous effects can be obtained.

(1) The puncture port 40 includes the cylindrical port main body portion 43 and the first partition 411 and the second partition 421 provided on the port main body portion 43, and the distance D between the first partition 411 and the second partition 421 in the puncture direction is set to be longer than at least the length HL in the puncture direction of the opening portion 220 of the through hole 215 at the tip portion of the needle tube portion 210 of the puncture instrument 200. With such a configuration, when the tip end of the opening portion 220 of the through hole 215 of the puncture instrument 200 begins to penetrate the first partition 411, the base end of the opening portion 220 of the through hole 215 of the puncture instrument 200 is positioned between the first partition 411 and the second partition 421, whereby it is possible to prevent leakage of the liquid inside the liquid storage container 1 through the opening portion 220 of the through hole 215 of the puncture instrument 200. Therefore, it is possible to maintain sealing performance in a state in which the liquid is taken out without fitting the puncture instrument 200 and the puncture port 40, or the like. Further, by setting the distance D between the first partition 411 and the second partition 421 in accordance with the puncture instrument 200 having the largest size of the length HL of the opening portion 220 of the through hole 215, it is possible to provide the puncture port 40 having high versatility which can be used regardless of the size (length) of the opening portion 220 of the through hole 215 of the puncture instrument 200. Further, by maintaining the sealing performance inside the second partition 421 by the second partition 421, it is possible to increase the degree of freedom in setting the inner diameter of the puncture port 40. That is, since it is possible to maintain the sealing performance without bringing the inner surface of the puncture port 40 into close contact with the outer surface of the puncture instrument 200, setting the inner diameter of the puncture port 40 to be large allows the puncture instrument 200 of various sizes (outer diameters) to be handled. Further, since it is possible to reduce the contact area between the outer peripheral surface of the puncture instrument 200 and the inner peripheral surface of the puncture port 40 when the puncture instrument 200 is inserted into the puncture port 40, it is possible to reduce the puncture resistance when the puncture instrument 200 is punctured into the puncture port 40.

(2) The liquid storage container 1 is configured to include the above-described puncture port 40 and the liquid accommodation portion 10 for accommodating the liquid, and one end of the puncture port 40 is provided inside the liquid accommodation portion 10. With such a configuration, since it is possible for the puncture instrument 200 to puncture while maintaining the sealing performance, it is possible to maintain the sterility of the interior of the liquid accommodation portion 10, whereby it is possible to reduce the occurrence of loss due to leakage of the liquid accommodated in the liquid accommodation portion 10.

(3) The liquid accommodation portion 10 is formed by welding the peripheral edge portions of the pair of sheet-shaped members provided in an opposite manner, the puncture port 40 is welded to the pair of sheet-shaped members 61 and 62, and the sheet-shaped members 61 and 62 and the puncture port 40 are made of the same material. With such a configuration, when the liquid storage container 1 is stored at a low temperature, for example, when the liquid storage container 1 is cryopreserved, the deformation characteristics of the puncture port 40 and the sheet-shaped members 61 and 62 become similar, so that it is possible to enhance the sealing performance between the first partition 411 and the second partition 421 inside the puncture port 40 and the sealing performance of the liquid accommodation space 11.

(4) The method of manufacturing the puncture port 40 includes the steps of: preparing the cylindrical first port member 41 having the first partition 411; preparing the cylindrical second port member 42 having the second partition 421; inserting a portion or all of the second port member 42 into the first port member 41 so that the second partition 421 is positioned inside the first port member 41; and, after the inserting step, welding the overlapping portion of the first port member 41 and the second port member 42. The inserting step further includes inserting the second port member 42 into the first port member 41 so that the distance D between the first partition 411 and the second partition 421 is longer than at least the length HL in the puncture direction of the opening portion 220 of the through hole 215 at the tip portion of the needle tube portion 210 of the puncture instrument 200. With such a configuration, it is possible to manufacture the puncture port 40 having a sealed structure by a simple method.

(5) The method of manufacturing the liquid storage container 1 includes the steps of: preparing the set of sheet-shaped members 61 and 62; preparing the cylindrical first port member 41 having the first partition 411; preparing the cylindrical second port member 42 having the second partition 421; inserting a portion or all of the second port member 42 into the first port member 41 so that the second partition 421 is positioned inside the first port member 41; and, after the inserting step, providing the first port member 41 and the second port member 42 between the set of the sheet-shaped members 61 and 62 overlapped in an opposite manner; after the providing step, welding a portion where the first port member 41, the second port member 42, and the set of sheet-shaped members 61 and 62 overlap; and forming the liquid accommodation portion 10 by welding the peripheral edge portions of the set of sheet-shaped members 61 and 62. The inserting step further includes inserting the second port member 42 into the first port member 41 so that the distance D between the first partition 411 and the second partition 421 is longer than at least the length HL in the puncture direction of the opening portion 220 of the through hole 215 at the tip portion of the needle tube portion 210 of the puncture instrument 200. With such a configuration, since it is possible to form the puncture port 40 and weld the sheet-shaped members 61 and 62 at the same time, it is possible to manufacture the liquid storage container 1 in a smaller number of steps compared to the case in which the puncture port 40 is formed by welding following which the puncture port 40 is welded to the sheet-shaped members 61 and 62.

Figure 12:
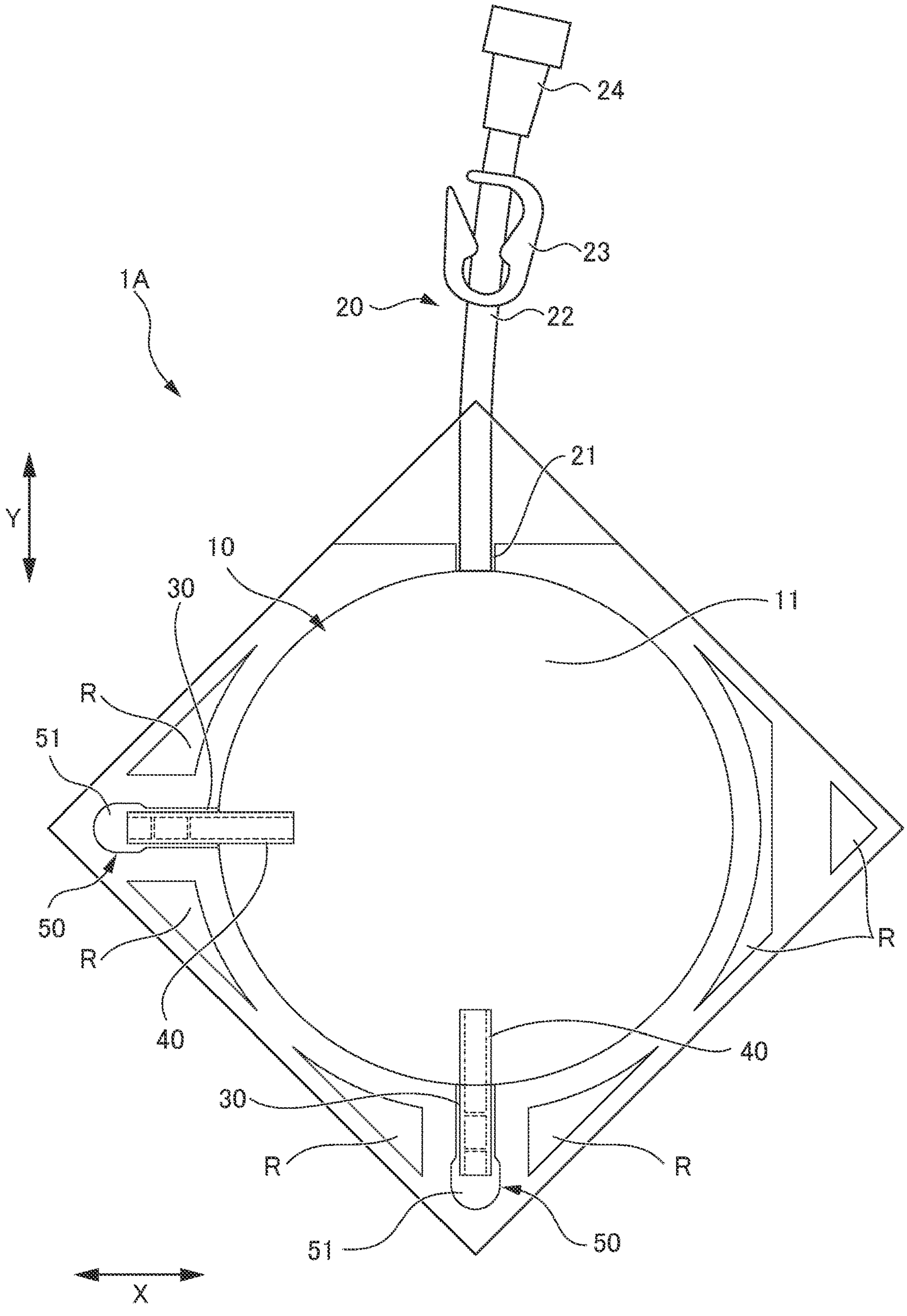
FIG. 12 is a plan view of a liquid storage container according to a second embodiment of the present invention.

Next, a liquid storage container 1A according to a second embodiment will be described with reference to FIG. 12. The liquid storage container 1A of the second embodiment differs from that of the first embodiment in that a plurality of puncture ports 40 and puncture port accommodation portions 50 are provided. In the description of the second embodiment, the same components are denoted by the same reference numerals, and descriptions thereof will be omitted or simplified.

In the liquid storage container 1A of the second embodiment, for example, two puncture ports 40 are each accommodated in the puncture port accommodation portion 50, and the puncture ports 40 are provided such that an angle formed by straight lines of the two puncture ports 40 along the puncture direction is about 90 degrees. When a plurality of puncture ports 40 are provided, at least one of the puncture ports 40 can be used for guiding liquid, and the other puncture ports 40 can be used for injecting liquid such as saline into the liquid accommodation portion 10. Further, by providing the plurality of puncture ports 40 such that the angle formed by the straight lines along the puncture direction of the plurality of puncture ports 40 is equal to or greater than 45 degrees, the plurality of puncture ports 40 are provided at positions apart from each other. Therefore, it is possible to reduce the possibility of erroneous opening of the other puncture port accommodation portion 50 when one puncture port accommodation portion 50 is cut by a scissor or the like and opened.

According to the liquid storage container 1A of the second embodiment described above, the following advantageous effects are obtained in addition to the above-described advantageous effects (1) to (5).

(6) The liquid storage container 1 is configured to include the plurality of puncture ports 40 each accommodated in the puncture port accommodation portion 50, and the plurality of puncture ports 40 are provided such that an angle formed by a straight line along the puncture direction of each of the plurality of puncture ports 40 is 45 degrees or more. With such a configuration, since the puncture ports 40 are provided at positions apart from each other, it is possible to reduce the possibility of erroneous opening of other puncture port accommodation portions when one puncture port accommodation portion is cut and opened by a scissor or the like.

Next, a liquid storage container 1B according to a third embodiment will be described with reference to FIGS. 13 to 17. In the third embodiment, a liquid storage container for use in storing a liquid such as a chemical solution will be described as an example. The liquid storage container 1B of the third embodiment differs from the first and second embodiments mainly in that a puncture port 40B includes a cap portion 44B. In the description of the third embodiment, the same components are denoted by the same reference numerals, and descriptions thereof will be omitted or simplified.

Figure 13:
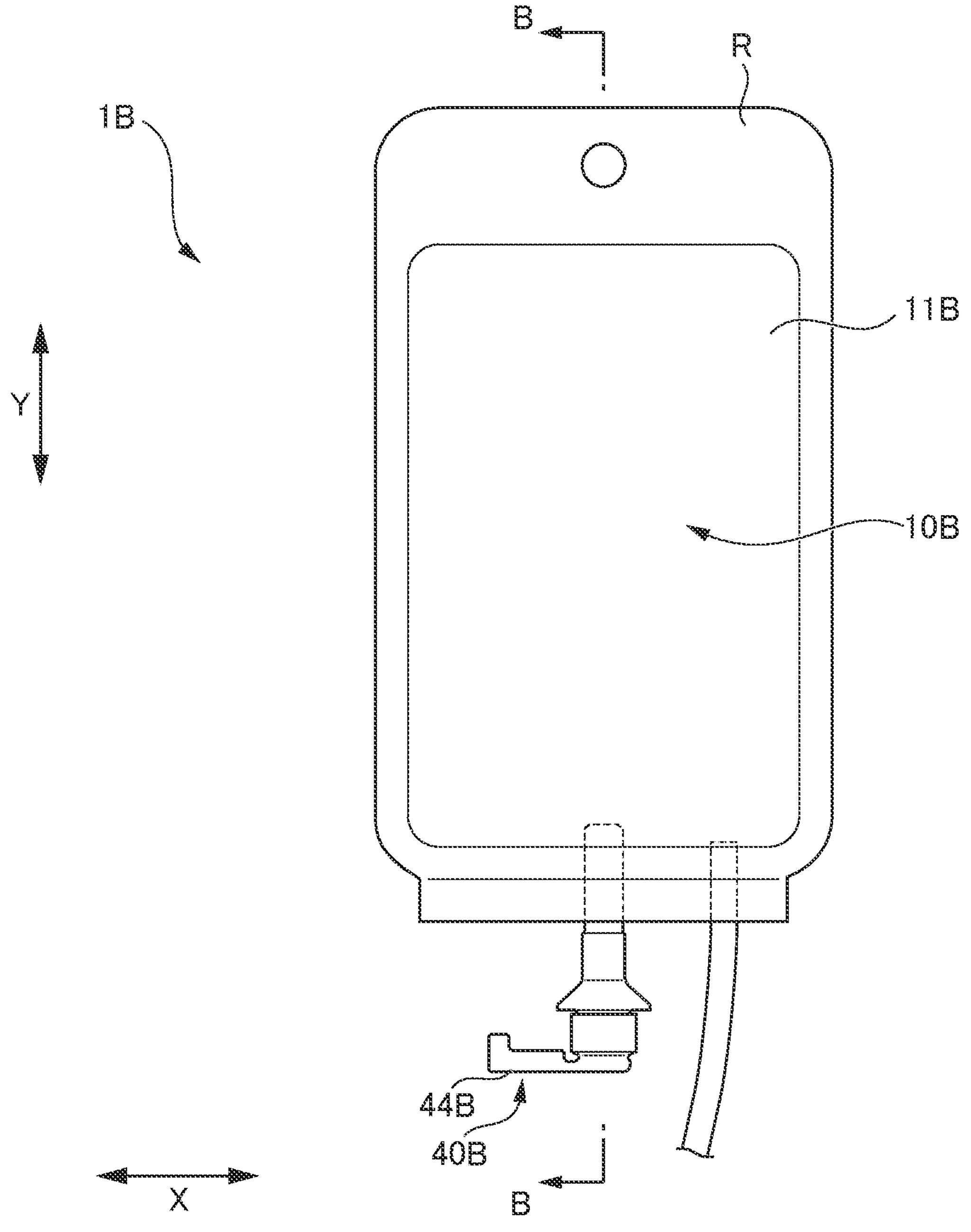
FIG. 13 is a plan view of a liquid storage container according to a third embodiment of the present invention.

As shown in FIG. 13, the liquid storage container 1B of the third embodiment includes a liquid accommodation portion 10B, a liquid introduction portion 20B, and a puncture port 40B. In the third embodiment, each member of the liquid storage container 1B is made of a thermoplastic resin such as polyvinyl chloride (PVC) resin.

Figure 14:
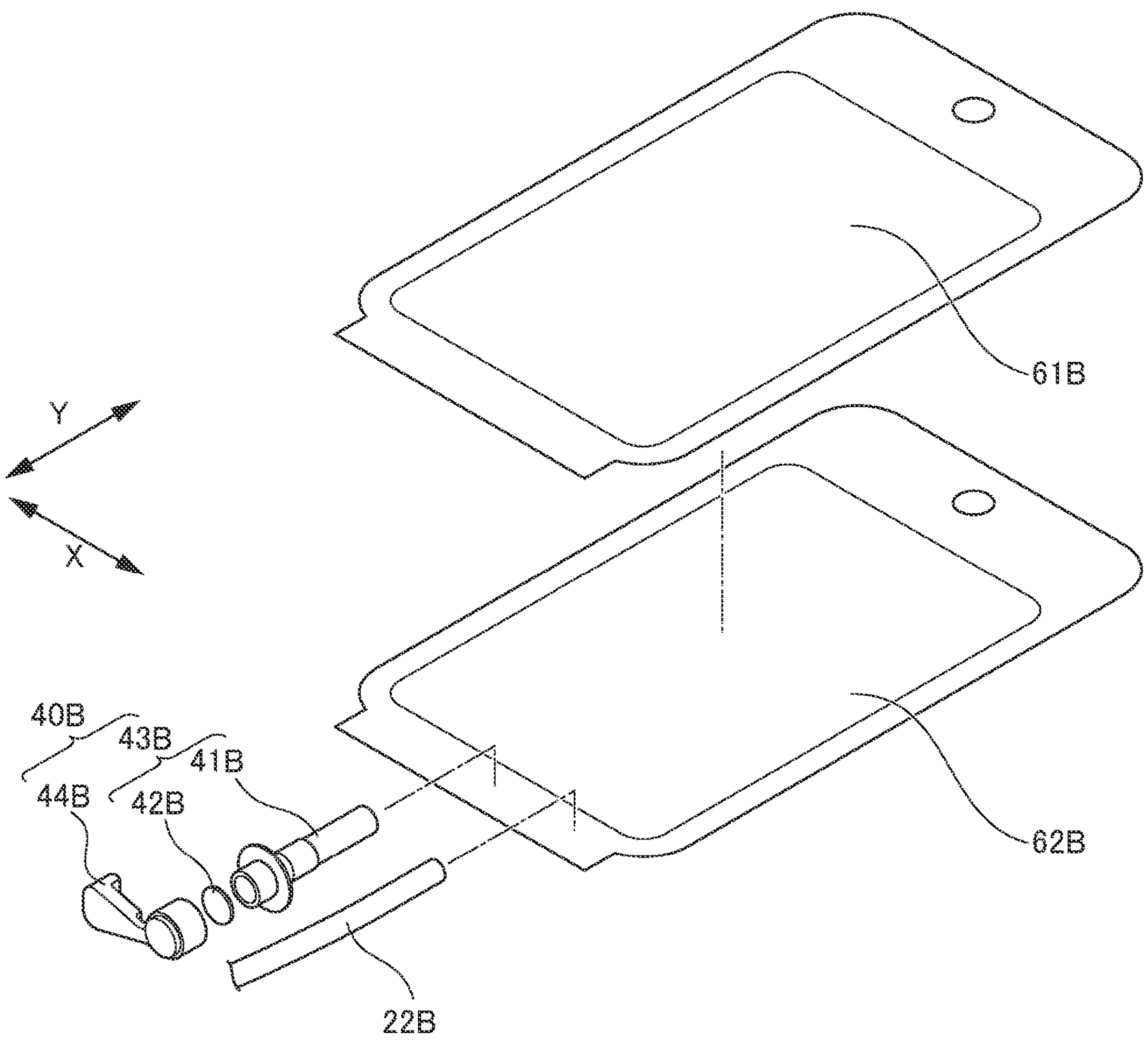
FIG. 14 is an exploded perspective view of a liquid storage container according to the third embodiment.
Figure 15:
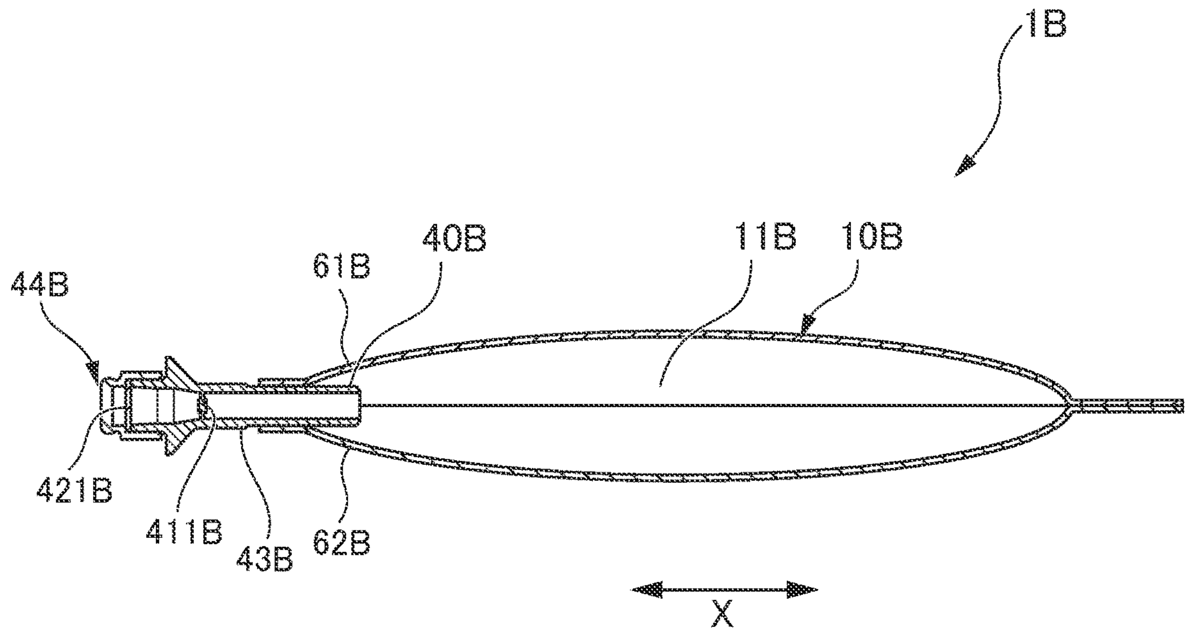
FIG. 15 is a cross-sectional view taken along the line B-B of FIG. 13.

As shown in FIGS. 13 to 15, the liquid accommodation portion 10B is formed by stacking and overlapping a pair of sheet-shaped members 61B and 62B and joining most of the peripheral edge portions thereof. The liquid accommodation portion 10B has a liquid accommodation space 11B which is a space surrounded by sheet-shaped members having peripheral edge portions joined to each other. In the third embodiment, the liquid accommodation portion 10B has a rectangular shape in a plan view as shown in FIG. 13.

The liquid introduction portion 20B is used when liquid is introduced into the liquid accommodation portion 10B. The liquid introduction portion 20B includes a liquid introduction tube 22B.

The liquid introduction tube 22B guides a liquid such as a chemical solution to the liquid accommodation portion 10B. In the third embodiment, the liquid introduction tube 22B is provided between the sheet-shaped members 61B and 62B such that one end of the liquid introduction tube 22B communicates with the liquid accommodation space 11B and the other end of the liquid introduction tube 22B protrudes to the outside of the sheet-shaped members 61B and 62B. In the third embodiment, the liquid storage container 1B is distributed in a state where the chemical liquid is stored in the liquid accommodation portion 10B. More specifically, a chemical liquid is introduced into the liquid accommodation portion 10B through the liquid introduction tube 22B. Then, the liquid introduction tube 22B is fused in a state in which the chemical liquid is accommodated in the liquid accommodation portion 10B, whereby the chemical liquid is accommodated in the liquid accommodation portion 10B in a sealed state.

The puncture port 40B is used to discharge the liquid accommodated in the liquid accommodation portion 10B. The puncture port 40B is provided at a position adjacent to a position where the liquid introduction portion 20B is provided in the liquid accommodation portion 10B having a rectangular shape in a plan view. As shown in FIGS. 14 and 15, the puncture port 40B includes a cylindrical port main body portion 43B, a first partition 411B, a second partition 421B, and a cap portion 44B. In the third embodiment, the puncture port 40B includes a port main body portion 43B including a first port member 41B and a second port member 42B, and a cap portion 44B (see FIG. 14).

The first port member 41B has a cylindrical shape having a flange portion F. The first port member 41B has a first partition 411B that closes the cylindrical portion inside by injection molding (see FIGS. 16A to 16C). The first port member 41B is provided such that one end thereof is positioned adjacent to the liquid accommodation portion 10B. At this time, the thickness at the center portion of the first partition 411B may be larger than the thickness at a portion of the first partition 411B adjacent to the wall surface of the first port member 41B. With such a configuration, when the first port member 41B is manufactured by injection molding, it is possible to stably form the first partition 411B.

Figure 16A:
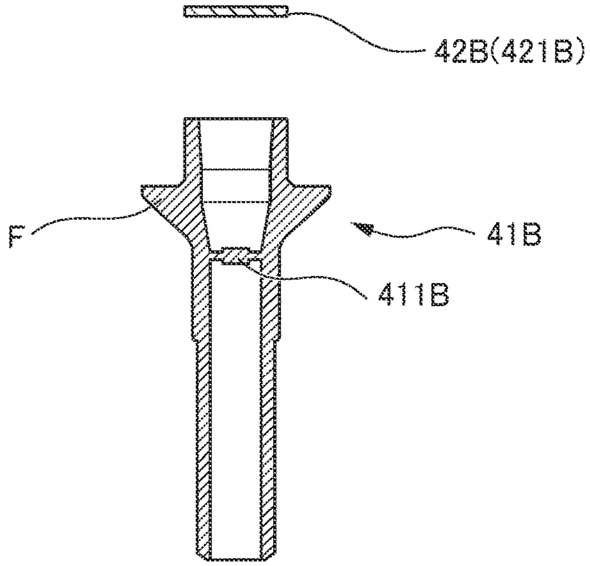
FIG. 16A is a schematic cross-sectional view of a manufacturing step of the puncture port of the third embodiment.
Figure 16B:
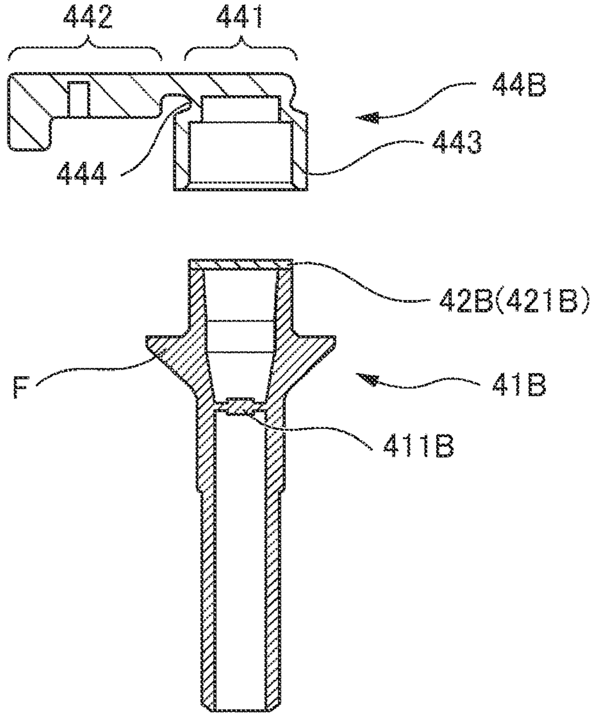
FIG. 16B is a view of a state in which a second port member is installed in a first port member from the state shown in FIG. 16A.
Figure 16C:
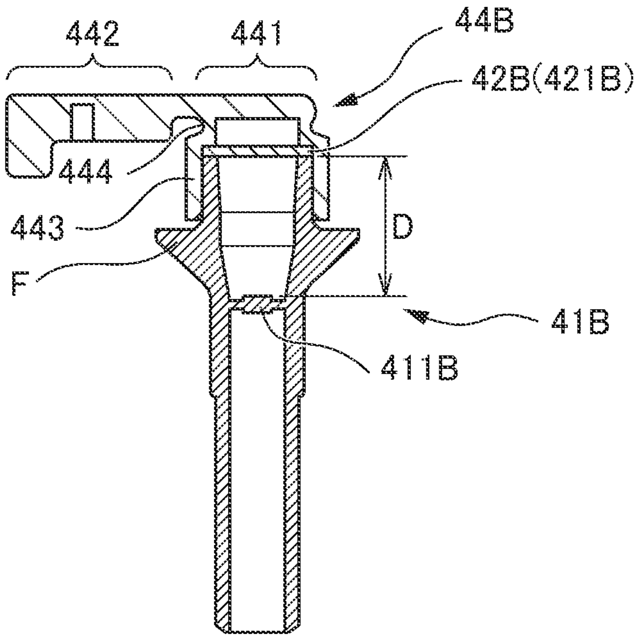
FIG. 16C is a view of a state in which a cap portion is attached to a port main body portion from the state shown in FIG. 16B.

The second port member 42B has a disk shape having a diameter substantially equal to the outer diameter of the other end portion of the first port member 41B, which is the end portion opposite to the one end adjacent to the liquid accommodation portion 10B (see FIGS. 16A to 16C). The second port member 42B is provided on the end face of the other end portion of the first port member 41B to provide a second partition 421B.

The cap portion 44B includes a cylindrical side wall portion 443, a cylindrical thin portion 444 which is provided on one end of the cylindrical side wall portion 443, connected to the side wall portion 443, and has a thickness smaller than that of the side wall portion 443, a lid portion 441 that closes an end portion of the thin portion 444 opposite to the side of the side wall portion 443, and a grip portion 442 which is connected to the lid portion 441 and extends in the surface direction of the lid portion 441 (see FIG. 16B).

The inner diameter of the side wall portion 443 is substantially equal to the outer diameter of the other end of the port main body portion 43B. Further, the inner diameter of the thin portion 444 is smaller than the inner diameter of the side wall portion 443. As shown in FIG. 16C, the cap portion 44B described above is provided with respect to the port main body portion 43B so as to cover the other end of the first port member 41B and the second partition 421B.

Here, the inner diameter of the side wall portion 443 is substantially equal to the outer diameter of the other end of the port main body portion 43B, and the inner diameter of the thin portion 444 is smaller than the inner diameter of the side wall portion 443. Therefore, by covering the port main body portion 43B with the cap portion 44B, the inner peripheral surface of the side wall portion 443 is in close contact with the outer peripheral surface of the first port member 41B, and the cap portion 44B can press the outer edge portion of the second port member 42B (the second partition 421B) by the step portion provided between the inner surface of the side wall portion 443 and the inner surface of the thin portion 444.

As shown in FIG. 16C, in the puncture port 40B, the distance D between the first partition 411B and the second partition 421B is set to be longer than the length HL of the opening portion 220 of the through hole 215 provided in the needle tube portion 210 of the puncture instrument 200 to be inserted into the puncture port 40B, as in the case described in the first and second embodiments.

Further, the inner diameter of the first port member 41B is larger than the outer diameter of the insertion portion of the puncture instrument 200. With such a configuration, it is possible to reduce the contact area between the inner peripheral surface of the puncture port 40B and the outer peripheral surface of the insertion portion of the puncture instrument. Therefore, it is possible to reduce the puncture resistance when the puncture instrument punctures the puncture port 40B.

Next, a method of manufacturing the puncture port 40B according to the third embodiment will be described with reference to FIGS. 16A to 16C.

First, the disk-shaped second port member 42B is provided on the other end surface of the first port member 41B (see FIGS. 16A and 16B). Next, the cap portion 44B is pressed over the first port member 41B and the second port member (the port main body portion 43B) (see FIG. 16C). Thus, the contact portion between the other end surface of the first port member 41B and the second port member 42B, the contact portion between the outer peripheral surface of the first port member 41B and the inner peripheral surface of the cap portion 44B (the inner peripheral surface of the side wall portion 443), and the contact portion between the step portion provided between the inner surface of the side wall portion 443 and the inner surface of the thin portion 444, and the second port member 42B (the second partition 421B) are brought into close contact with each other.

In the third embodiment, since the PVC resin is used as a material of the puncture port 40B, when the contact portion is heated in a close contact state, the contact portion is joined by blocking. The heat treatment may be performed in a subsequent high-pressure sterilization treatment. When manufacturing the puncture port 40B using a material for which it is difficult to join the contact portion by blocking, the first port member 41B, the second port member 42B, and the cap portion 44B may be joined by laser welding or the like.

The cap portion 44B manufactured as described above is broken at the thin portion 444 by pulling the grip portion 442 in a state in which the cap portion 44B is attached to the port main body portion 43B, whereby the lid portion 441 can be separated from the side wall portion 443. By providing the puncture port 40B with the cap portion 44B, it is possible to maintain the sterility inside the cap portion 44B until the lid portion 441 is opened and removed to puncture the puncture port 40B with a puncture instrument such as a bottle needle, and the second partition 421B is exposed.

Figure 17A:
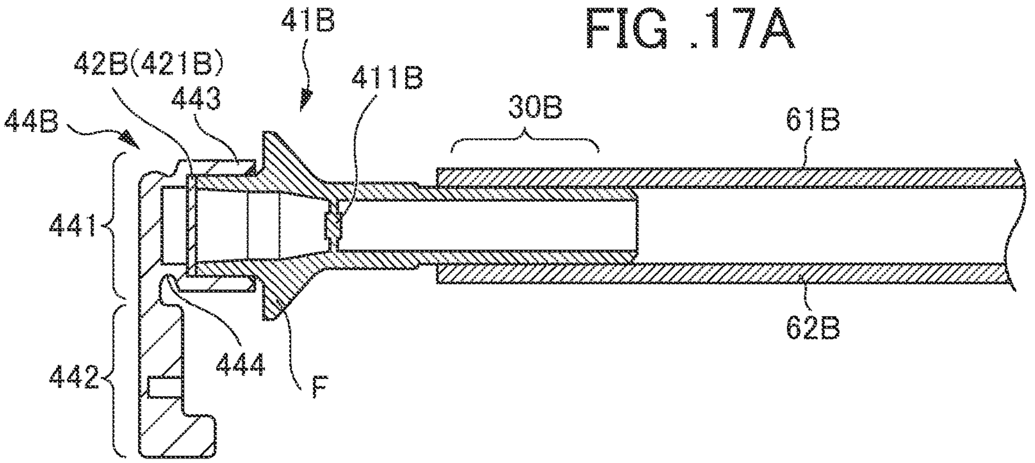
FIG. 17A is a schematic cross-sectional view of a manufacturing step of the liquid storage container according to the third embodiment, and is a diagram of a state in which the puncture port is provided between a pair of sheet-shaped members which are overlapping each other in an opposite manner.
Figure 17B:
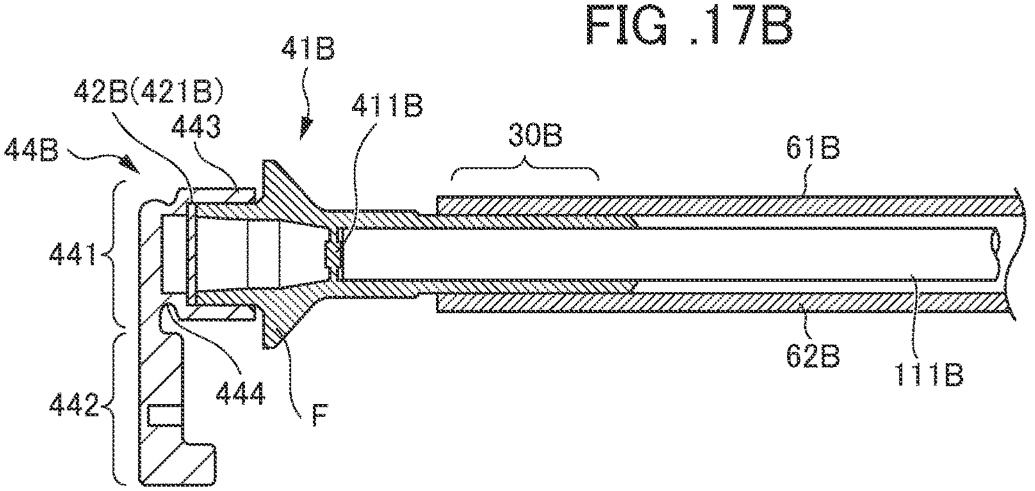
FIG. 17B is a view of a state in which a welding pin is inserted from the first port member side of the puncture port from the state shown in FIG. 17A.
Figure 17C:
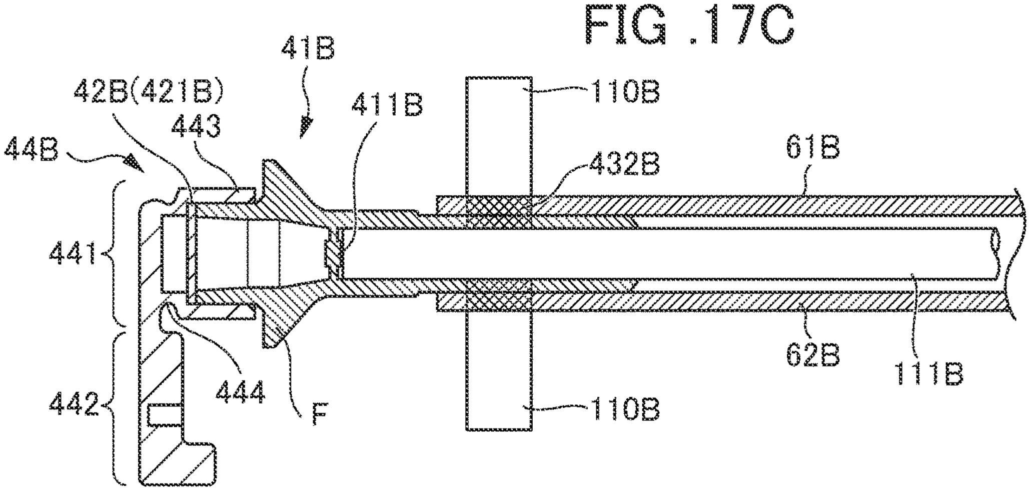
FIG. 17C is a view of a state in which a part of the portion where the puncture port and the pair of sheet-shaped members are overlapping is welded from the state shown in FIG. 17B.

Next, a method of manufacturing the liquid storage container 1B according to the third embodiment will be described with reference to FIGS. 17A to 17C. First, the puncture port 40B is provided between the overlapped sheet-shaped members 61B and 62B (see FIG. 17A). Next, a welding pin 111B is inserted into the puncture port 40B provided between the sheet-shaped members 61B and 62B from the first partition 411B side (see FIG. 17B). Next, the sheet-shaped members 61B and 62B and the puncture port 40B (the first port member 41B) are sandwiched between the welding pin 111B and welding molds 110B and 110B at the puncture port 40B and in the vicinity of the puncture port 40B and welded by high-frequency welding (thermal welding). Thus, the welded portion 432B is formed. In this way, the puncture port 40B is attached to the sheet-shaped members 61B and 62B. The puncture port 40B is subjected to radiation sterilization by gamma rays or electron beam before being attached to the sheet-shaped members 61B and 62B.

Next, as in the case described in the first embodiment, the peripheral edge portions of the sheet-shaped members 61B and 62B, which are located outside the portion forming the liquid accommodation portion 10B, are joined by high-frequency welding (thermal welding) to form the liquid accommodation portion 10B. Further, the liquid introduction tube 22B is welded to the sheet-shaped members 61B and 62B to form the liquid introduction path 21B.

Thus, the liquid storage container 1B having the liquid accommodation portion 10B is manufactured.

In the liquid storage container 1B, the chemical solution is then introduced into the liquid accommodation portion 10B through the liquid introduction tube 22B. Thereafter, the liquid introduction tube 22B is fused, whereby the chemical liquid is accommodated in the liquid accommodation portion 10B in a sealed state. Then, the liquid storage container 1B in which the chemical solution is accommodated in the liquid accommodation portion 10B is subjected to a sterilization treatment by high-pressure steam sterilization. As described above, by heating during the sterilization process by high-pressure steam sterilization, the contact portions of the components of the puncture port 40B are joined by blocking.

Next, a liquid storage container according to a modified example of the third embodiment will be described with reference to FIGS. 18 and 19. The liquid storage container of the modified example of the third embodiment is different from the third embodiment in that a gap is provided between a cap portion 44C of a puncture port 40C and a port main body portion 43C, and an open hole portion is provided in a second partition 421C. In the description of the modified example of the third embodiment, the same components are denoted by the same reference numerals, and descriptions thereof will be omitted or simplified.

Figure 19A:
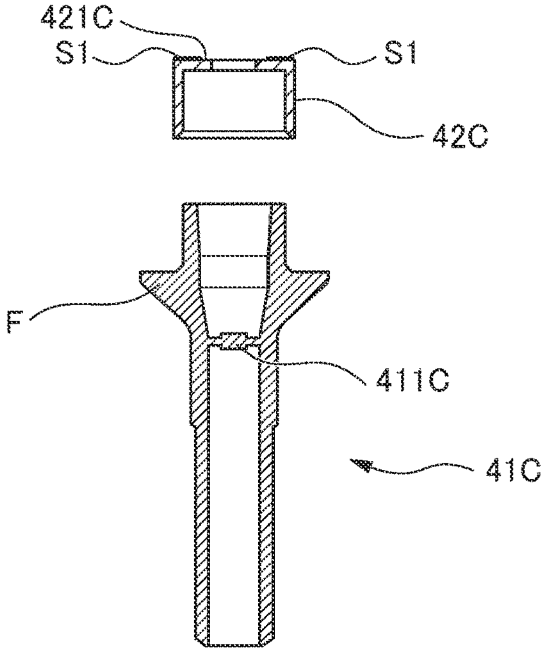
FIG. 19A is a schematic cross-sectional view of a manufacturing step of the puncture port according to the modified example of the third embodiment.
Figure 19B:
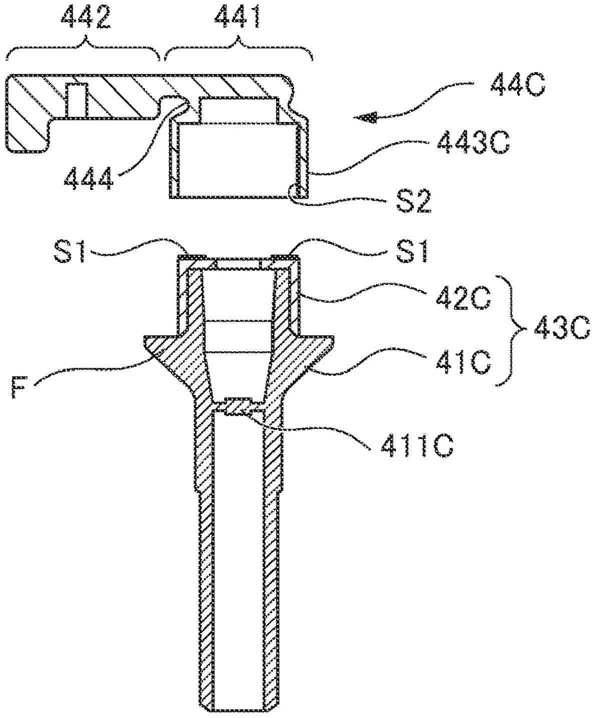
FIG. 19B is a view of a state in which a second port member is covered with a first port member from the state shown in FIG. 19A.
Figure 19C:
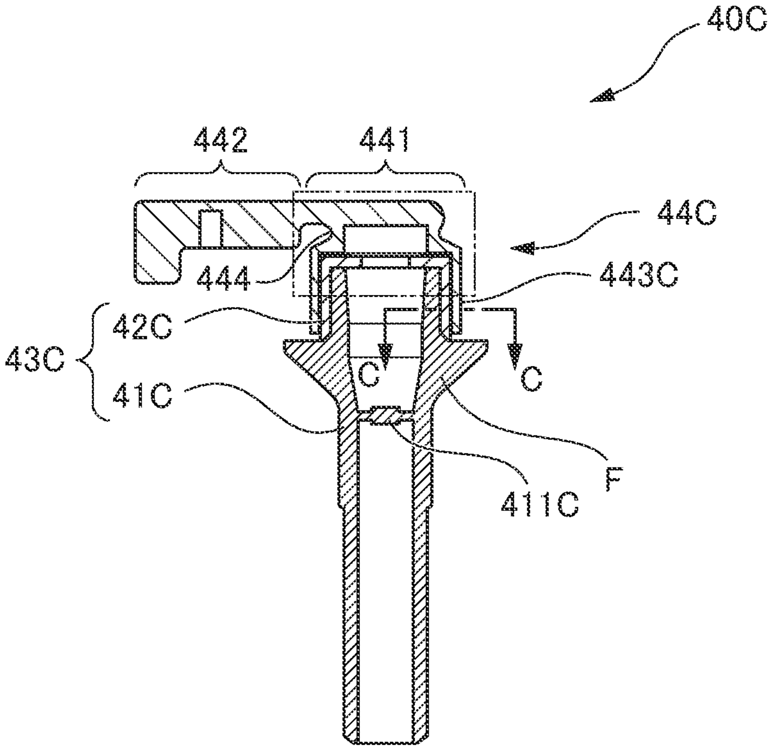
FIG. 19C is a view of a state in which the cap portion is attached to a port main body portion from the state shown in FIG. 19B.

A liquid storage container according to a modified example of the third embodiment includes the liquid accommodation portion 10B, the liquid introduction portion 20B, and a puncture port 40C having a cap portion 44C (see FIG. 19C). As in the third embodiment, each member of the liquid storage container 1C is made of a thermoplastic resin such as polyvinyl chloride (PVC) resin. In this modified example, the puncture port 40C having a configuration different from that of the third embodiment will be described in detail.

Similarly to the liquid storage container of the third embodiment, the puncture port 40C is provided at a position adjacent to the position where the liquid introduction portion is provided in the liquid storage portion having a rectangular shape in a plan view. The puncture port 40C includes a cylindrical port main body portion 43C, a first partition 411C, and a second partition 421C. In this modified example, the puncture port 40C includes the port main body portion 43C including a first port member 41C and a second port member 42C, and a cap portion 44C (see FIGS. 19B and 19C).

Since the configuration of the first port member 41C is the same as that of the first port member 41B, the description thereof will be omitted.

Figure 18A:
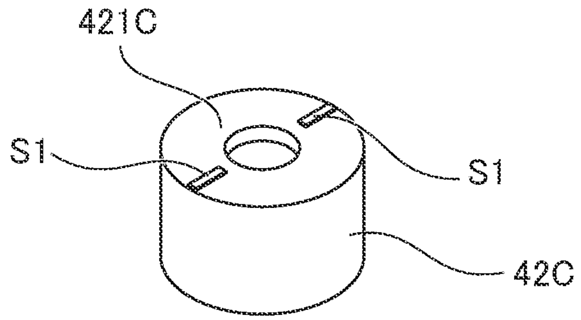
FIG. 18A is an explanatory diagram of a second port member included in a puncture port according to a modified example of the third embodiment of the present invention.

The second port member 42C has a cylindrical shape and includes one end portion closed by the second partition 421C (see FIGS. 18A and 19A to 19C). The second port member 42C is configured such that the inner diameter of the cylindrical portion is substantially equal to the outer diameter of the other end portion (the end portion opposite to the liquid accommodation portion 10B) of the first port member 41C, and is provided so as to cover the outer side of the other end portion of the first port member 41C (see FIG. 19B). As shown in FIG. 18A, in the second port member 42C, an open hole portion is provided in the second partition 421C, and two ribs S1 are provided on the outer surface of the second partition 421C. The ribs S1 each function as a spacer for providing a gap between the second partition 421C and the cap portion 44C. In the present modified example, the two ribs S1 are provided at equal intervals. However, the present invention is not limited thereto. As long as a gap can be provided between the second partition 421C and the cap portion 44C, one or three or more ribs S1 may be provided at predetermined intervals.

Figure 18B:
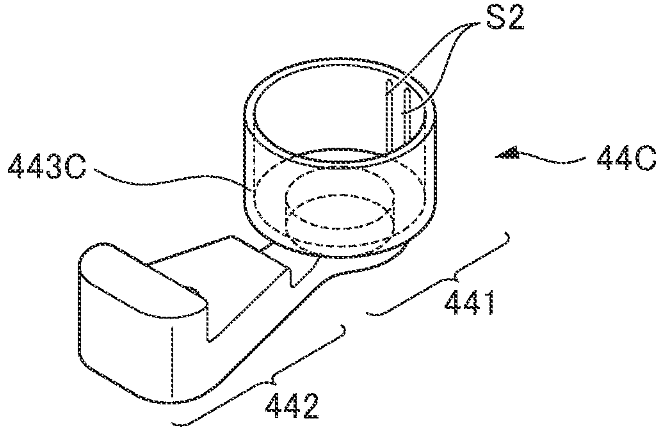
FIG. 18B is an explanatory diagram of a cap portion included in the puncture port according to the modified example of the third embodiment.

The cap portion 44C includes a lid portion 441, a grip portion 442, a cylindrical side wall portion 443C, and a cylindrical thin portion 444 (see FIG. 19B). Since the configurations of the lid portion 441, the grip portion 442, and the thin portion 444 are the same as those of the cap portion 44B, descriptions thereof will be omitted. In the present modified example, as shown in FIG. 18B, two ribs S2 serving as spacers are provided on the inner peripheral surface of the side wall portion 443C on the side opposite to the side where the grip portion 442 is provided. These two ribs S2 extend along the axial direction of the cylindrical side wall portion 443C. The shape of the rib S2 is not limited to the shape shown in FIG. 18, as long as a continuous space can be provided in the axial direction of the side wall portion 443C. For example, the rib S2 may have a shape extending in a direction sloped at a predetermined angle with respect to the axial direction of the side wall portion 443C, and the rib S2 may include a plurality of short linear ribs that extend in the axial direction and are provided at predetermined intervals in the axial direction. Further, in order to provide a space continuous in the axial direction of the side wall portion 443C, a circular or rectangular rib S2 may be provided at the center portion in the axial direction of the side wall portion 443C. Further, for example, a plurality of small circular or rectangular ribs may be provided at predetermined intervals in a broken line shape extending in the axial direction.

Next, a method of manufacturing the puncture port 40C of the third embodiment will be described with reference to FIGS. 19A to 19C. FIGS. 19A to 19C are schematic cross-sectional views in the manufacturing step of the puncture port 40C.

First, a cylindrical second port member 42C is placed over the other end portion of the first port member 41C (see FIGS. 19A and 19B). Next, the cap portion 44C is pressed over the second port member 42C (the port main body portion 43C) (see FIG. 19C). In this way, the contact portion between the outer peripheral surface of the first port member 41C and the inner peripheral surface of the second port member 42C, and the contact portion between the outer surface of the second port member 42C and the inner peripheral surface of the cap portion 44C are brought into close contact with each other. In this modified example, as in the third embodiment, since the PVC resin is used as the material of the puncture port 40C, when the contact portion is heated in the close contact state, the contact portion is joined by blocking. The heat treatment may be performed in a subsequent high-pressure sterilization treatment. When the puncture port 40C is manufactured using a material for which it is difficult to join the contact portion by blocking, the first port member 41C, the second port member 42C, and the cap portion 44C may be joined by laser welding or the like.

Figure 20A:
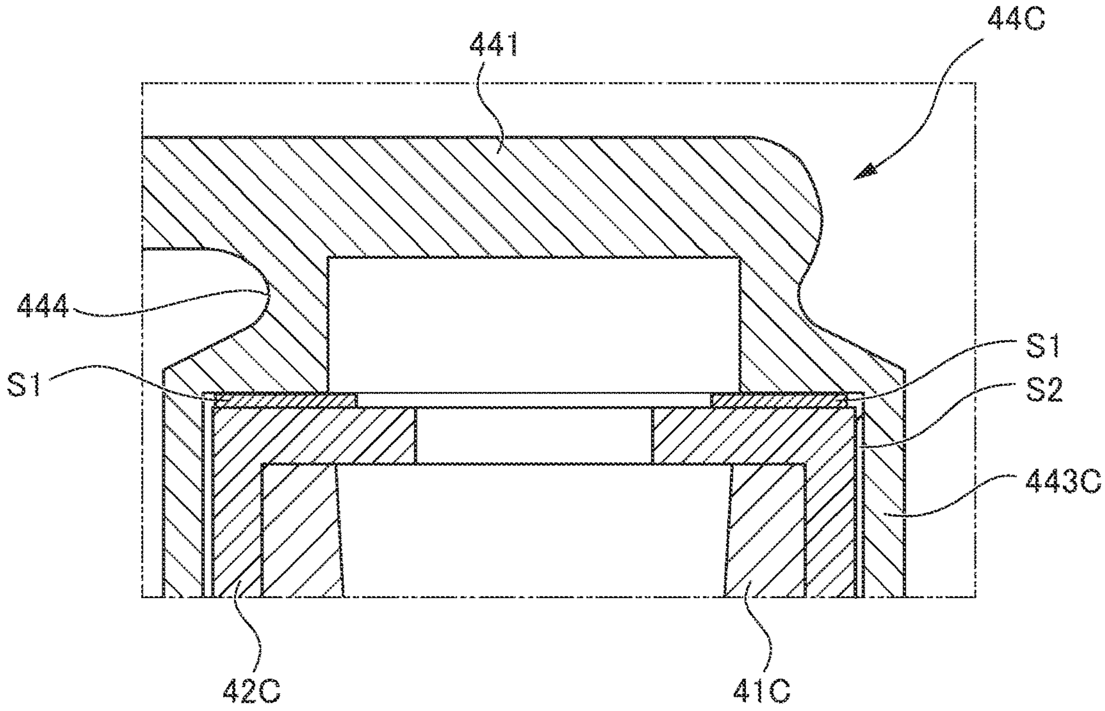
FIG. 20A is an enlarged view of a dotted line portion of the puncture port shown in FIG. 19C.
Figure 20B:
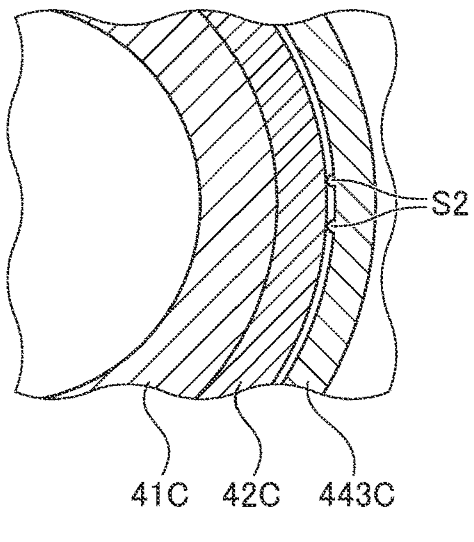
FIG. 20B is a cross-sectional view taken along the line C-C of the puncture port shown in FIG. 19C.

Here, with reference to FIGS. 20A and 20B, the joining state of the cap portion 44C and the port main body portion 43C in the puncture port 40C will be described in detail. When the cap portion 44C is covered with the port main body portion 43C, a gap is formed between the end face of the thin portion 444 and the second partition 421C by the ribs S1 provided on the second port member 42C (the second partition 421C), and the cap portion 44C slightly floats from the second partition 421C (see FIG. 20A).

Further, most of the inner peripheral surface of the side wall portion 443C of the cap portion 44C is closely joined to the outer peripheral surface of the second port member 42C. On the other hand, a gap is formed between the portion where the rib S2 is formed and the outer peripheral surface of the second port member 42C (see FIG. 20B). Therefore, in the inner peripheral surface of the side wall portion 443C of the cap portion 44C, the side adjacent to the grip portion 442 is brought into close contact with the outer peripheral surface of the second port member 42C and joined thereto, so that the side is less likely to come off even when an external force is applied, compared to the portion where the rib S2 is provided, which is the side distant from the grip portion 442.

In the cap portion 44C manufactured as described above, since the side adjacent to the grip portion 442 is joined to the outer peripheral surface of the second port member 42C, the grip portion 442 is pulled in a state attached to the port main body portion 43C as in the case described in the third embodiment, whereby the cap portion 44C is broken at the thin portion 444 and the lid portion 441 can be separated from the side wall portion 443C.

By providing the puncture port 40C with the cap portion 44C, it is possible to maintain the sterility inside the cap portion 44C until the lid portion 441 is opened and removed to puncture the puncture port 40C with a puncture instrument such as a bottle needle, and the second partition 421C is exposed. Further, in the puncture port 40C, fluid can flow to the inside where the first partition 411C exists through a gap provided between the cap portion 44C and the port main body portion 43C and an open hole portion provided in the second partition 421C.

Since the manufacturing method of the liquid storage container 1C according to the modified example of the third embodiment is the same as that of the third embodiment, a description thereof will be omitted.

The liquid storage container 1C is sterilized by high-pressure steam sterilization after the chemical solution is stored in the liquid accommodation portion and the liquid introduction tube is fused. In this modified example, the puncture port 40C is configured such that fluid can flow from the cap portion 44C side to the inside where the first partition 411C exists. Therefore, the inside of the puncture port 40C can also be sterilized by high-pressure steam sterilization. As described above, by heating during the sterilization process by high-pressure steam sterilization, the contact portions of the components of the puncture port 40C are joined by blocking.

A state in which the puncture instrument 200 punctures the puncture port 40C will be described in detail with reference to FIGS. 21A to 21F. In this modified example, the same puncture instrument 200 as in the first embodiment is used.

Figure 21A:
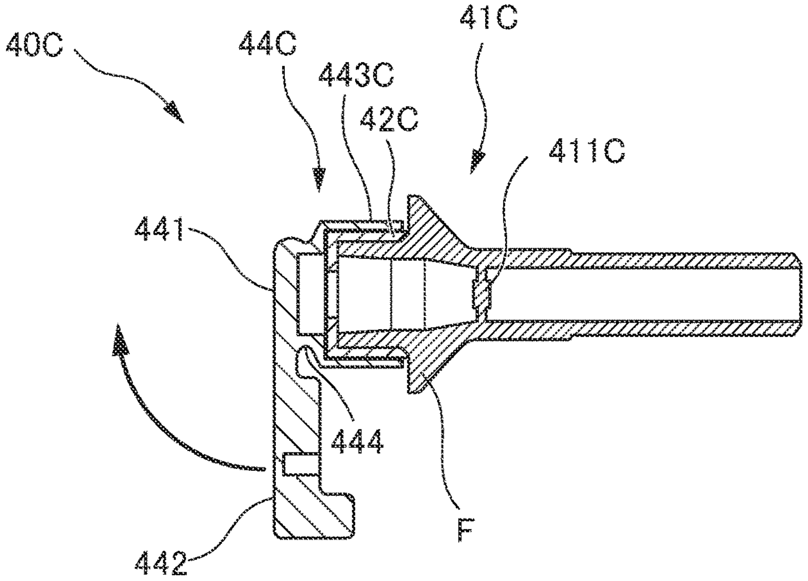
FIG. 21A is an explanatory diagram when a portion of the cap portion of the puncture port according to the modified example of the third embodiment of the present invention is removed.
Figure 21B:
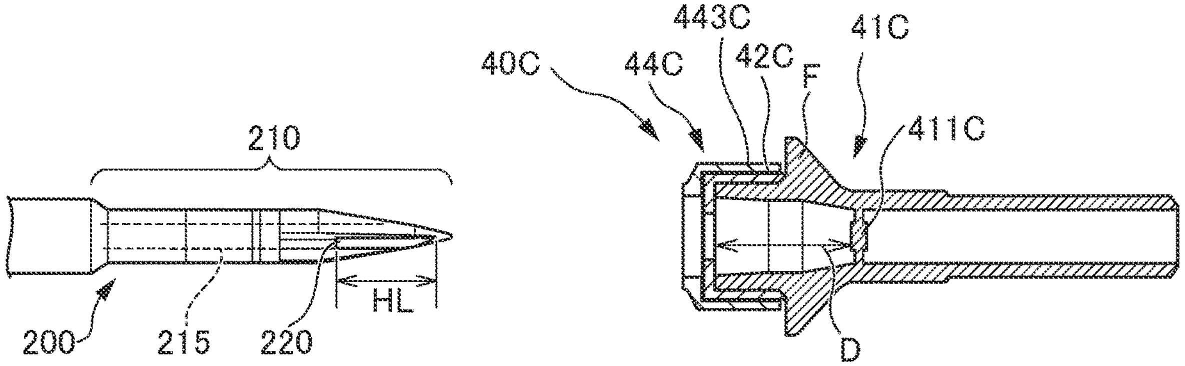
FIG. 21B is an explanatory diagram when a puncture instrument is punctured in a puncture port according to the modified example of the third embodiment of the present invention.

FIG. 21A shows the puncture port 40C before the lid portion 441 of the cap portion 44C is removed. When the grip portion 442 of the cap portion 44C is held and pulled in the direction of the arrow from this state, the lid portion 441 is removed and the state shown in FIG. 21B is achieved. At this time, since the open hole portion is provided in the second partition 421C, the sealing performance of the space between the first partition 411C and the second partition 421C is temporarily lost. However, the sealing performance of the space closer to the liquid accommodation portion than the first partition 411C is maintained.

From the state shown in FIG. 21B, the insertion of the puncture instrument 200 into the puncture port 40C is started. At this time, since the open hole portion is provided at the center portion of the second partition 421C, there is almost no resistance to break the second partition 421C by the puncture instrument 200. At this time, the open hole portion is preferably equal to or smaller than the outer diameter of the needle base end portion of the opening portion 220, and the puncture resistance can be further reduced as the size of the open hole portion becomes closer to the outer diameter. Further, at this time, a minute through hole serving as an open hole portion may be provided at the center portion of the second partition 421C.

Figure 21C:
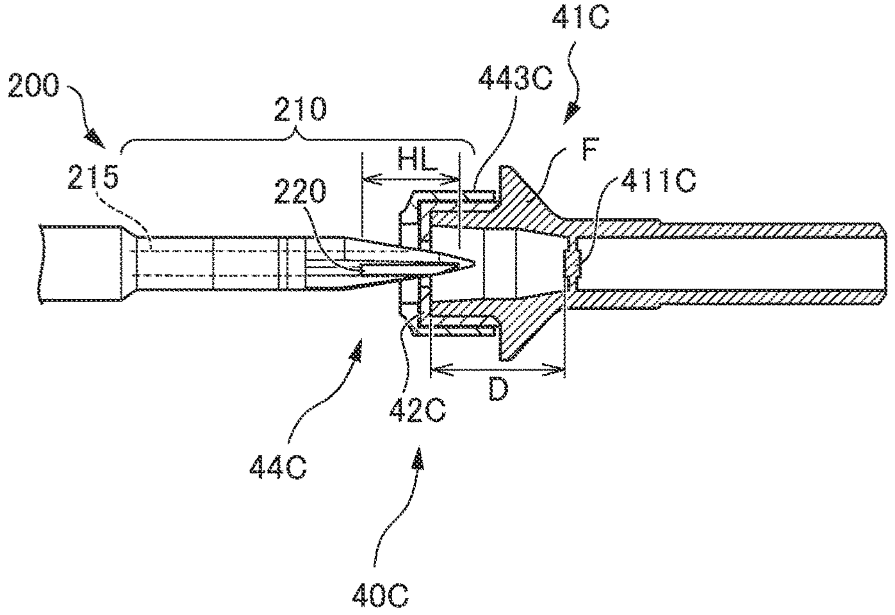
FIG. 21C is an explanatory diagram when the puncture instrument is punctured in the puncture port according to the modified example of the third embodiment of the present invention.

FIG. 21C shows a state in which the tip portion penetrates the second partition 421C after the insertion of the puncture instrument 200. In this state, since the base end side of the opening portion 220 of the through hole 215 is located outside the second partition 421C and the tip end side is located inside the second partition 421C (between the first partition 411 and the second partition 421), the sealing performance of the space between the first partition 411C and the second partition 421C remains lost.

Figure 21D:
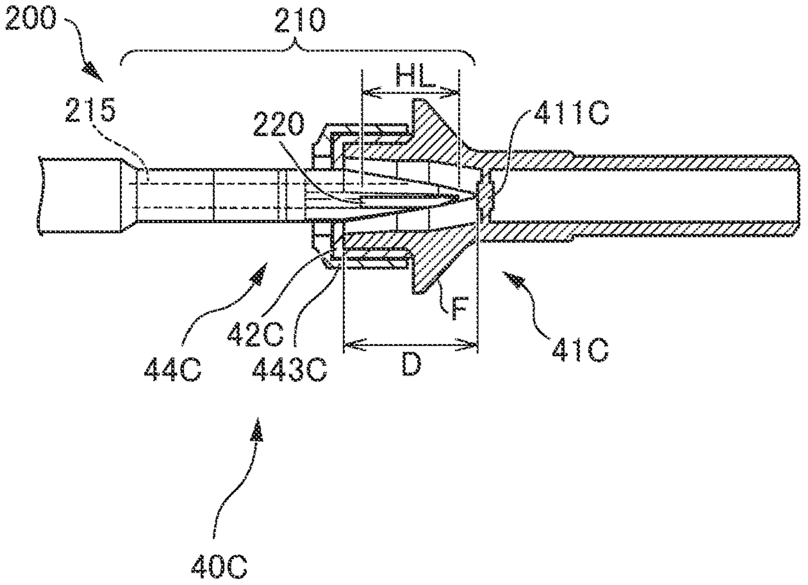
FIG. 21D is an explanatory diagram when the puncture instrument is punctured in the puncture port according to the modified example of the third embodiment of the present invention.

FIG. 21D shows a state in which the puncture instrument 200 is further inserted from the state shown in FIG. 21C, and the opening portion 220 of the through hole 215 is located between the first partition 411C and the second partition 421C. In this state, since the entire opening portion 220 of the through hole 215 is located between the first partition 411C and the second partition 421C, and the penetrated portion (the open hole portion) of the second partition 421C is closed by the puncture instrument 200, the space between the first partition 411C and the second partition 421C is sealed.

Figure 21E:
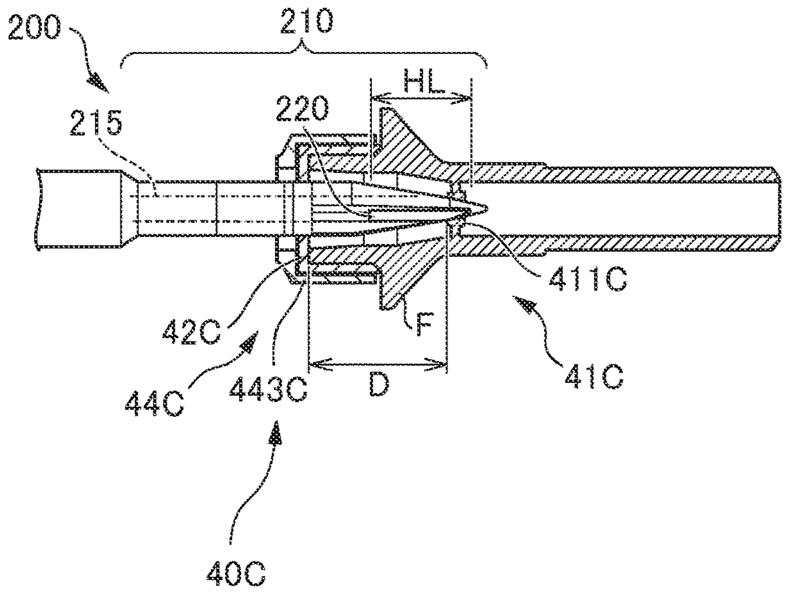
FIG. 21E is an explanatory diagram when the puncture instrument is punctured in the puncture port according to the modified example of the third embodiment of the present invention.

FIG. 21E shows a state in which the puncture instrument 200 is further inserted from the state shown in FIG. 21D and the tip portion of the puncture instrument 200 is in the middle of passing through the first partition 411C. In this state, since the base end side of the opening portion 220 of the through hole 215 is located between the first partition 411C and the second partition 421C, and the tip end side is located inside the first partition 411C (adjacent to the liquid accommodation portion), the space between the first partition 411C and the second partition 421C, and the liquid accommodation portion communicate with each other. However, since the penetrated portion (the open hole portion) of the second partition 421C is closed by the puncture instrument 200, the sealing performance of the space on the inner side from the second partition 421C is maintained.

Figure 21F:
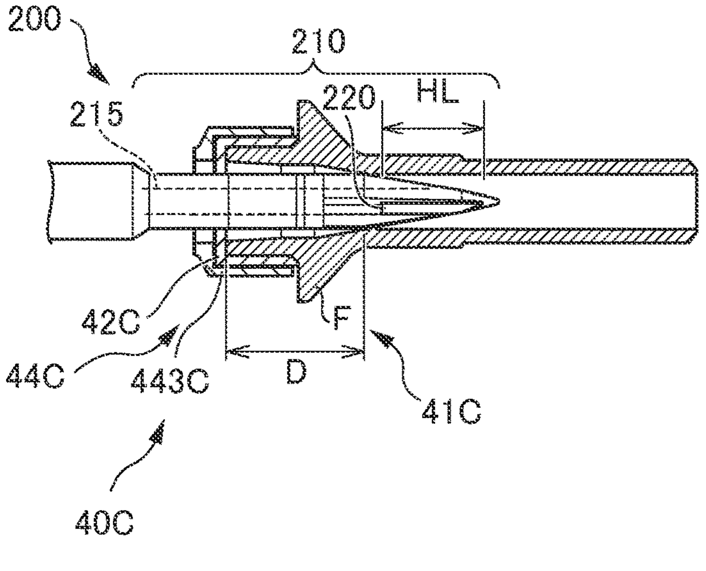
FIG. 21F is an explanatory diagram when the puncture instrument is punctured in the puncture port according to the modified example of the third embodiment of the present invention.

FIG. 21F shows a state in which the puncture instrument 200 is further inserted from the state shown in FIG. 21E, and the tip portion of the puncture instrument 200 penetrates the first partition 411C. In this state, since the opening portion 220 of the through hole 215 is located closer to the liquid-accommodation portion than the first partition 411C, the liquid can be favorably taken out while maintaining the sealing performance in the liquid-accommodation portion.

According to the puncture port 40B and the liquid storage container 1B of the third embodiment or the puncture port 40C and the liquid storage container 1C of the modified example of the third embodiment described above, the following advantageous effects are obtained in addition to the above-described advantageous effects (1) to (6).

(7) The puncture port 40B (40C) is configured to include the cap portion 44B (44C) having the lid portion 441. Further, the lid portion 441 is provided in the port main body portion 43B (43C) so as to cover the second partition 421B (421C), and the lid portion 441 is configured to be removable so that the second partition 421B (421C) is exposed during use. With such a configuration, it is possible to remove the lid portion 441 to puncture the puncture port 40B (40C) with the puncture instrument 200 such as a bottle needle, and it is possible to maintain the sterility inside the cap portion 44B (44C) until the second partition 421B (421C) is exposed.

(8) A gap for fluid to flow is provided between the port main body portion 43C and the cap portion 44C, and an open hole portion is provided at the center portion of the second partition 421C. With such a configuration, since the puncture port 40C is configured such that fluid can flow from the cap portion 44C side to the inside where the first partition 411C exists, it is possible to sterilize the inside of the puncture port 40C by high-pressure steam sterilization. In addition, it is possible to reduce the resistance when the puncture instrument 200 breaks through the second partition 421C.

(9) In the third embodiment and the modified examples thereof, the thickness at the center portion of the first partition 411B is made larger than the thickness at a portion of the first partition 411B adjacent to the wall surface of the first port member 41B. With such a configuration, when the first port member 41B is manufactured by injection molding, it is possible to stably mold the first partition 411B.

The preferred embodiments of the puncture port and the liquid storage container of the present invention have been described above. However, the present invention is not limited to the above-described embodiments, and can be appropriately modified. For example, in the first embodiment and the second embodiment, two sheet-shaped members are used as an example of a set of sheet-shaped members for forming the liquid main container. That is, a pair of sheet-shaped members may be formed with a cylindrical sheet-shaped member or by bending and overlapping one sheet-shaped member.

Further, in the first embodiment and the second embodiment, the shape of the liquid accommodation portion is circular. That is, it suffices if the shape of the liquid accommodation portion is a curved shape having no corner portion and, therefore, the shape may be an elliptical shape instead of a circular shape. In a case where the liquid accommodation portion has a rectangular shape, the corner portion is preferably rounded. This facilitates removal of air bubbles from the inside of the liquid introduction portion after introduction of the liquid and before sealing the liquid introduction portion.

Further, in the first embodiment and the second embodiment, the puncture port accommodation portion 50 and the liquid accommodation portion 10 are configured without three-dimensional molding on the sheet-shaped members 61 and 62. However, the present invention is not limited thereto. That is, the liquid accommodation portion 10 and the puncture port accommodation portion 50 may be configured with three-dimensional shapes of the sheet-shaped members 61 and 62, respectively, and the sheet-shaped members 61 and 62 may be overlapped so that the positions of the three-dimensional shape portions match with each other to join the sheet-shaped members 61 and 62.

Further, in the first embodiment, the liquid storage container 1 is subjected to EOG sterilization. However, the present invention is no limited thereto. That is, the liquid storage container may be subjected to radiation sterilization such as gamma rays or electron beam.

Further, in the third embodiment and the modified examples thereof, the thickness at the center portion of the first partition 411B is made larger than the thickness at a portion of the first partition 411B adjacent to the wall surface of the first port member 41B. However, the thickness at the center portion of the first partition may also be made larger than the thickness at a portion of the first partition adjacent to the wall surface of the first port member in the first and second embodiments.

In the modified example of the third embodiment, the ribs S1 are integrally provided adjacent to the port main body portion 43C, and the ribs S2 are integrally provided on the cap portion 44C. However, the present invention is not limited thereto. As long as the structure functions as a spacer for forming a gap between the port main body portion and the cap portion, it may be provided on either side, and a protrusion-like structure instead of a rib may be provided inside the puncture port.

Further, in each of the above-described embodiments and the modified examples thereof, the first port member having the first partition and the second port member having the second partition are provided and joined, whereby the port main body portion having the first and second partitions is formed. However, the present invention is not limited thereto. For example, the partition may be formed by melting the inner wall surface of the port member by providing the cylindrical port member having no partition formed thereon in the liquid discharge portion, welding the cylindrical port member, and then irradiating the cylindrical port member with laser light so as to pass through the lumen of the port member. Further, the partition may be formed by irradiating the lumen of the port member with laser light before the cylindrical port member in which no partition is formed is joined to the liquid discharge portion, and then the partition may be provided in the liquid discharge portion, and welded and joined.

EXPLANATION OF REFERENCE NUMERALS

1, 1A and 1B liquid storage container
10 and 10B liquid accommodation portion
20 and 20B liquid introduction portion
30 liquid discharge portion
40, 40A, 40B, 40C puncture port
41, 41B, 41C first port member

42, 42B, 42C second port member
43, 43B, 43C port main body portion
44B, 44C cap portion
50 puncture port accommodation portion
51 puncture port accommodation space
411, 411B, 411C first partition
421, 421B, 421C second partition
200 puncture instrument
210 needle tube portion
215 through hole
220 opening portion

The invention claimed is:

1. A puncture port that is provided in a liquid storage container for storing a liquid, and is puncturable with a puncture instrument including a needle tube portion having a through hole provided therein, the puncture port comprising:

a cylindrical port main body portion comprising a first port member and a second port member; and a first partition and a second partition provided in the cylindrical port main body portion, wherein the first port member has a pair of slits extending in a longitudinal direction of the first port member at one end of the first port member, and wherein a distance between the first partition and the second partition in a puncture direction is longer than at least a length of an opening portion of the through hole at a tip portion of the needle tube portion in the puncture direction.

2. The puncture port according to claim 1, further comprising a cap portion including a lid portion, wherein the cap portion is provided in the cylindrical port main body portion to cover the second partition, and during use, the lid portion is removable so that the second partition is exposed.

3. The puncture port according to claim 2, further comprising:

a gap for fluid to flow between the cylindrical port main body portion and the cap portion, and an open hole portion at a center portion of the second partition.

4. A liquid storage container comprising:

a liquid accommodation portion that accommodates a liquid; and the puncture port according to claim 1 having one end provided in an interior of the liquid accommodation portion.

5. The liquid storage container according to claim 4, wherein the liquid accommodation portion is provided by welding peripheral edge portions of a set of sheet-shaped members provided in an opposite manner, the puncture port is welded to the set of sheet-shaped members, and the sheet-shaped members and the puncture port are made of a same material.

* * * * *